United States Patent [19]
Hagano et al.

[11] Patent Number: 5,996,830
[45] Date of Patent: *Dec. 7, 1999

[54] FUEL TANK CAP

[75] Inventors: Hiroyuki Hagano, Inazawa; Masayuki Nakagawa, Iwakura, both of Japan

[73] Assignee: Toyoda Gosei Co., Ltd., Aichi-ken, Japan

[*] Notice: This patent is subject to a terminal disclaimer.

[21] Appl. No.: 09/050,952

[22] Filed: Mar. 31, 1998

[30] Foreign Application Priority Data

Mar. 31, 1997 [JP] Japan ................................ 9-097964

[51] Int. Cl.$^6$ .................................................. B65D 51/16
[52] U.S. Cl. ............. 220/203.28; 220/303; 220/DIG. 33
[58] Field of Search ........................... 220/DIG. 33, 304, 220/303, 203.23, 203.24, 203.26, 203.27, 203.28, 203.29

[56] References Cited

U.S. PATENT DOCUMENTS

| | | |
|---|---|---|
| 3,937,357 | 2/1976 | Burgess ........................ 220/DIG. 33 X |
| 4,540,103 | 9/1985 | Kasugai et al. . |
| 4,572,396 | 2/1986 | Kasugai et al. . |
| 4,588,102 | 5/1986 | Kasugai . |
| 4,666,056 | 5/1987 | Kasugai et al. . |
| 4,724,868 | 2/1988 | Kasugai et al. . |
| 4,726,488 | 2/1988 | Kasugai . |
| 4,785,961 | 11/1988 | Kasugai et al. . |
| 4,795,053 | 1/1989 | Kasugai et al. . |
| 4,815,705 | 3/1989 | Kasugai et al. . |
| 4,854,471 | 8/1989 | Kasugai et al. . |
| 4,944,425 | 7/1990 | Kasugai et al. . |

*Primary Examiner*—Stephen K. Cronin
*Assistant Examiner*—Nathan Newhouse
*Attorney, Agent, or Firm*—Cushman Darby & Cushman; Pillsbury Madison & Sutro LLP

[57] ABSTRACT

A fuel tank cap structure with reduced casing body weight and improved dimensional accuracy is disclosed. The casing body of the fuel tank cap has a valve chamber, in which a positive pressure valve and a negative pressure valve are received. The casing body includes an outer tubular body and a valve chamber-forming member located inside the outer tubular body. The outer tubular body is joined with the valve chamber-forming member via a horizontal joint member and vertical horizontal members, which are arranged in a hollow portion.

9 Claims, 24 Drawing Sheets

FUEL TANK CAP

BACKGROUND OF THE INVENTION

1. Field of the Invention

The present invention relates to a cap of a fuel tank with a pressure control valve for controlling pressure in the fuel tank.

2. Description of the Related Art

One known example of fuel tank caps is disclosed in JAPANESE UTILITY PATENT PUBLICATION GAZETTE No. 6-88606. FIG. 38 is a sectional view illustrating a fuel tank cap 300. As shown in FIG. 38, the fuel tank cap 300 includes a plastic casing body 302 screwed to a filler neck FN of a fuel tank (not shown), a cover member 330 attached to the casing body 302, and a negative pressure valve 340 received in a valve chamber 304 of the casing body 302 for controlling pressure in the fuel tank. The negative pressure valve 340 includes a rubber valve body 342, a valve supporting member 346 with a fitting aperture 346a for supporting the valve body 342, and a spring 348 for pressing the valve body 342. When the differential pressure between the tank pressure and the atmospheric pressure applied to the valve body 342 increases to or above a predetermined level, the negative pressure valve 340 opens to make the tank pressure approach atmospheric pressure.

The casing body 302 has threads 302a formed on the circumference thereof to be screwed to the filler neck FN. The casing body 302 is thus required to have high mechanical strength. The casing body 302 has a valve chamber 304 in which the negative pressure valve 340 is received. High dimensional accuracy is required to enhance the sealing characteristics of the fuel cap. If the wall thickness of the casing body were increased to enhance the mechanical strength of the casing body 302, then sink marks are formed in injection molding which deteriorate the dimensional accuracy.

SUMMARY OF THE INVENTION

The object of the present invention is thus to provide a fuel tank cap with a casing body of reduced weight and improved dimensional accuracy.

At least part of the above and the other related objects is realized by a fuel tank cap for closing an inlet of a filler neck of a fuel tank. The fuel tank cap includes: a casing body having a valve chamber and being molded by injecting a resin; and a pressure control valve having a valve body and being received in the valve chamber. The casing body has a seat member, on which the valve body is seated and separated from, and a hollow portion formed at a site close to the seat member.

In the fuel tank cap of the present invention, the casing body receives a pressure control valve in the valve chamber and has a seat member, on which the valve body of the pressure control valve is seated. The casing body further includes a hollow portion formed at a site close to the seat member. The hollow portion reduces the resin contraction in the vicinity of the seat member, thereby attaining excellent dimensional accuracy in the seat member and ensuring high sealing characteristics for the seat member.

The present invention is also directed to a fuel tank cap for closing an inlet of a filler neck of a fuel tank. The fuel tank cap includes: a casing body having a valve chamber and being molded by injecting a resin; and a pressure control valve received in the valve chamber. The casing body includes: an outer tubular body fitted in the filler neck; a valve chamber-forming member arranged inside the outer tubular body across a gap, the valve chamber-forming member defining the valve chamber; and a joint member, which joins the outer tubular body with the valve chamber-forming member and has a hollow portion as the gap in the casing body.

In the casing body of the fuel tank cap according to the present invention, the valve chamber-forming member is located inside the outer tubular body across a gap. The gap between the outer tubular body and the valve chamber-forming member forms the hollow portion. A horizontal joint member joins the outer tubular body with the valve chamber-forming member. In accordance with one preferable application, the horizontal joint member is constructed as a wall surface that prevents the fuel tank from being connected to the atmosphere. A plurality of vertical joint members may be arranged in the hollow portion at predetermined intervals in the circumferential direction to join the outer tubular body with the valve chamber-forming member. The vertical joint members compensate for the lowered mechanical strength of the casing body due to the existence of the hollow portion.

In accordance with one preferable application, the valve chamber-forming member includes an upper cylindrical wall element having a predetermined diameter, a lower wall element having a smaller diameter than the diameter of the upper cylindrical wall element, and a bottom element formed on a lower portion of the lower wall element, which are integrally formed in a cup shape to define the valve chamber. In accordance with another preferable application, the fuel tank cap further includes an inner cover that closes an opening of the valve chamber-forming member. The inner cover has a positioning rib, which extends from an outer circumference of the inner cover and is inserted in the hollow portion to position the inner cover. For example, four positioning ribs may be arranged at substantially identical intervals along the circumference of the inner cover. The inner cover may be welded to the opening of the valve chamber-forming member by ultrasonic welding.

DESCRIPTION OF THE PREFERRED EMBODIMENTS

Figure 1:
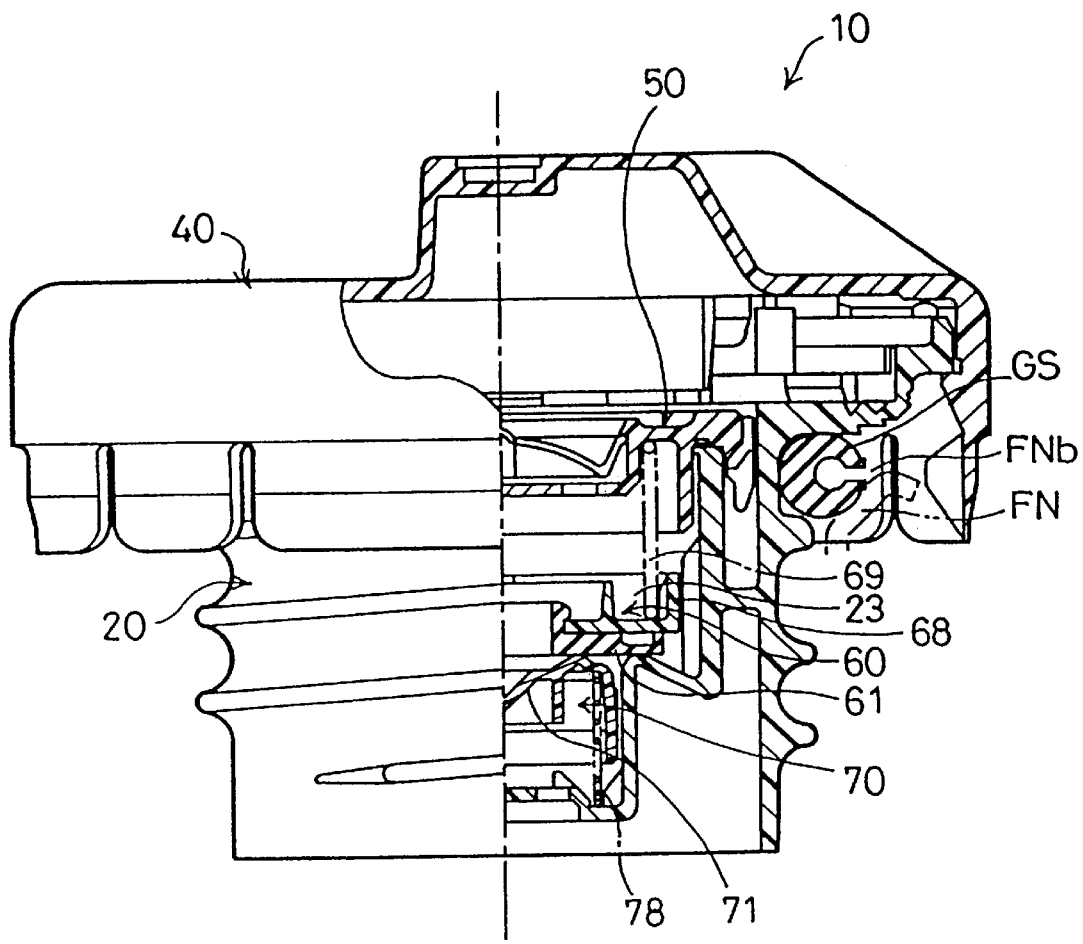
FIG. 1 is a half sectional view illustrating a fuel tank cap embodying the present invention.

FIG. 1 is a half sectional view illustrating a fuel tank cap 10 embodying the present invention. The fuel tank cap 10 is screwed to a filler neck FN having an inlet FNb through which a supply of fuel is fed to a fuel tank (not shown). The fuel tank cap 10 includes a casing body 20 composed of a synthetic resin material, such as, for example, polyacetal, a cover member 40 attached to an upper portion of the casing body 20 and composed of a synthetic resin material, such as, for example, nylon, an inner cover 50 for closing an upper opening of the casing body 20 to define a valve chamber 23, a positive pressure valve 60 and a negative pressure valve 70 received in the valve chamber 23 to function as pressure control valves, and a gasket GS attached to the upper circumference of the casing body 20 for sealing the casing body 20 from the filler neck EN. The positive pressure valve 60 includes a valve body 61, a valve support member 68 for supporting the valve body 61, and a means for pressing the valve body 61, such as, a coil spring 69, via the valve support member 68. The negative pressure valve 70 includes a valve body 71, and a means for pressing the valve body 61, such as, a coil spring 78.

The positive pressure valve 60 and the negative pressure valve 70 control the pressure in the fuel tank according to the following process. In the state that the fuel tank cap 10 is screwed to the filler neck FN, when the tank pressure increases and the differential pressure between the tank pressure and the atmospheric pressure applied to the valve body 61 of the positive pressure valve 60 exceeds a predetermined level, the valve body 61 moves upward against the pressing force of the coil spring 69 to open the positive pressure valve 60. When the tank pressure decreases and the differential pressure between the tank pressure and the atmospheric pressure applied to the valve body 71 of the negative pressure valve 70 exceeds a predetermined level, on the other hand, the valve body 71 moves downward to open the negative pressure valve 70. When the positive pressure difference or the negative pressure difference between the tank pressure of the fuel tank and the atmospheric pressure becomes equal to or greater than the predetermined level, the positive pressure valve 60 or the negative pressure valve 70 opens to control the tank pressure to be within a predetermined range about the atmospheric pressure.

The following describes the structure of the respective constituents of the fuel tank cap 10 of the present embodiment in detail.

Figure 2:
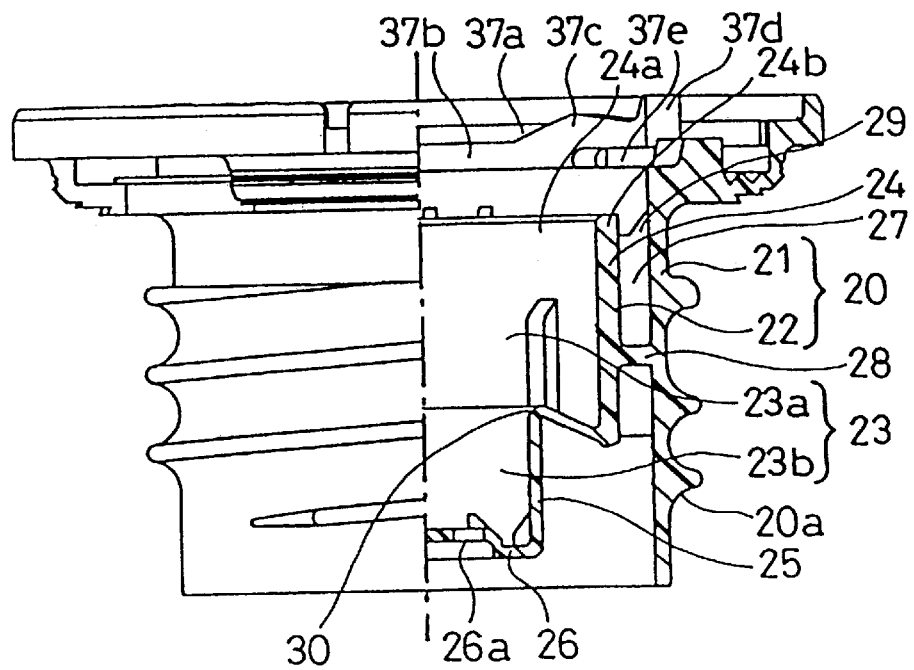
FIG. 2 is a half sectional view illustrating a casing body
Figure 3:
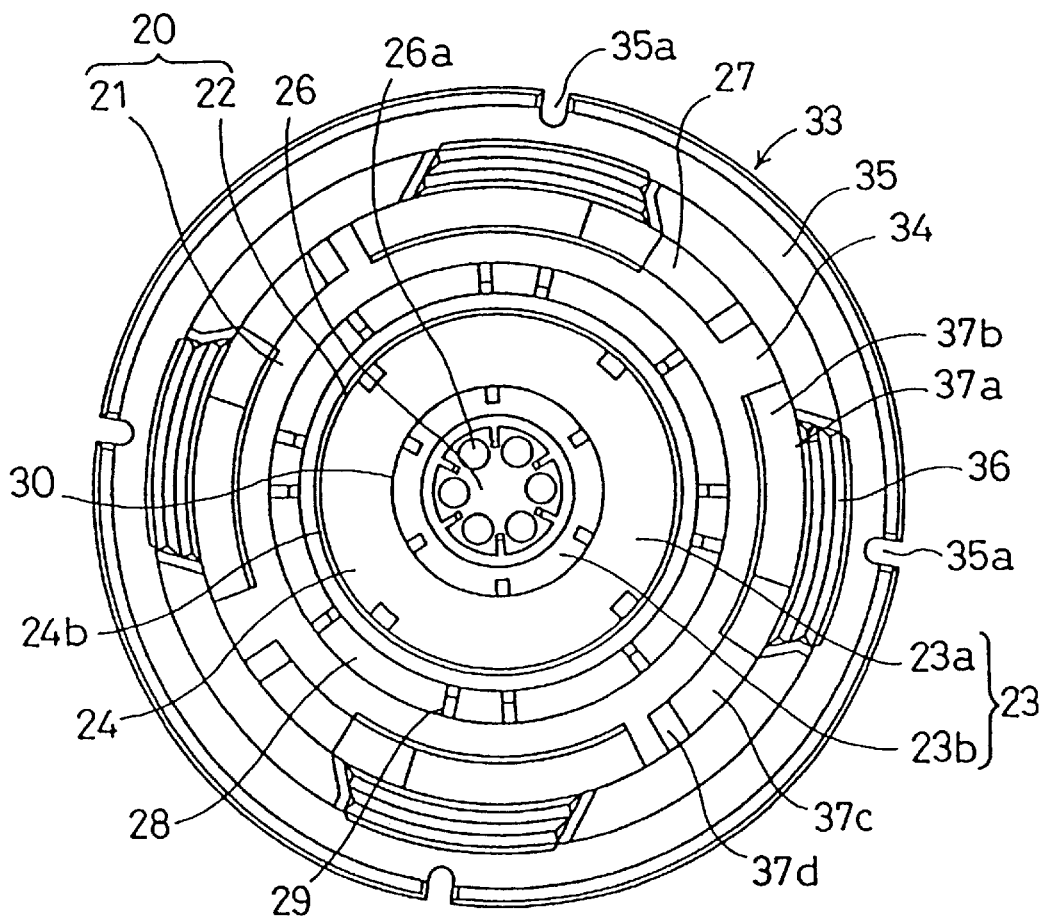
FIG. 3 is a plan view illustrating the casing body.
Figure 4:
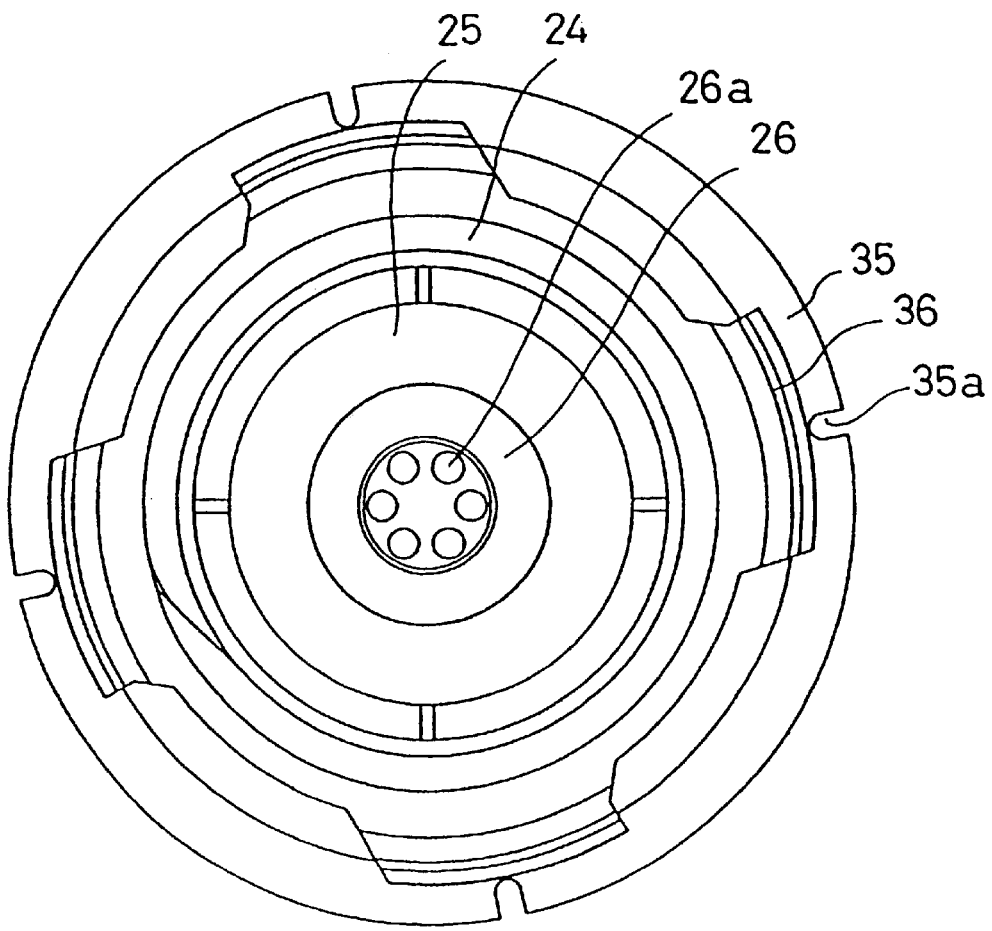
FIG. 4 is a bottom view illustrating the casing body.

FIG. 2 is a half sectional view illustrating the casing body 20, FIG. 3 is a plan view of the casing body 20, and FIG. 4 is a bottom view of the casing body 20. The casing body 20 includes an outer tubular body 21 of a substantially cylindrical shape having threads 20a screwed to the inner wall of the filler neck FN and a valve chamber-forming member 22 disposed inside the outer tubular body 21. The valve chamber-forming member forms the valve chamber 23, in which the positive pressure valve 60 and the negative pressure valve 70 shown in FIG. 1 are received.

Figure 5:
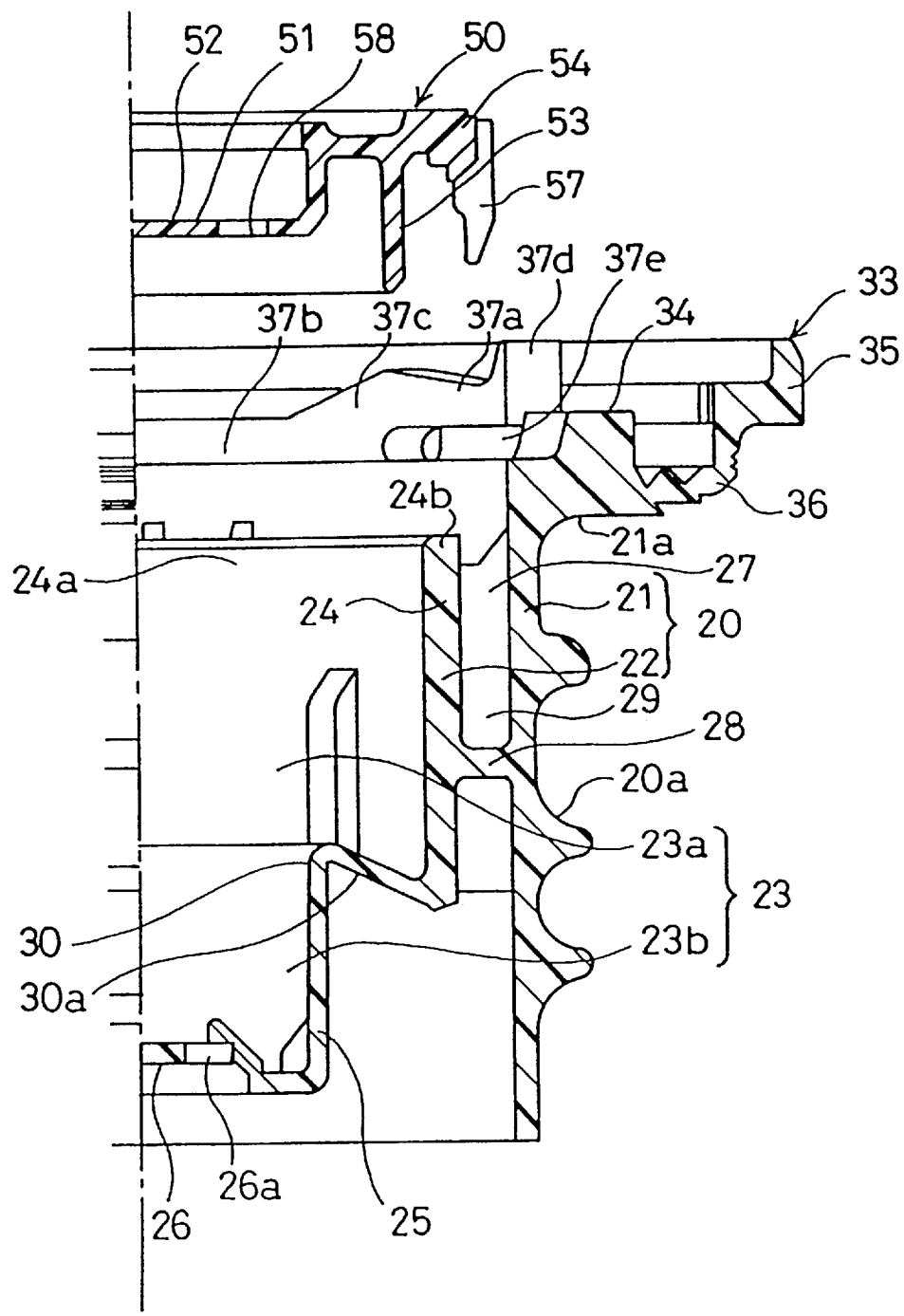
FIG. 5 is a half sectional view illustrating the casing body and an inner cover.

FIG. 5 is an enlarged half sectional view illustrating the casing body 20 when the inner cover 50 has not yet been set in the casing body 20. The outer tubular body 21 and the valve chamber-forming member 22 are integrally joined with each other via a horizontal joint member 28 and a plurality of vertical joint members 29. The horizontal joint member 28 is a ring element arranged slightly below the center of the valve chamber-forming member 22. The horizontal joint member 28 functions to separate the fuel tank from the atmosphere. Hollow portions 27 are formed in the space between the outer tubular body 21 and the valve chamber-forming member 22 and defined by the horizontal joint member 28 and the vertical joint members 29. The vertical joint members 29 are upright walls extending radially to join the outer tubular body 21 with the valve chamber-forming member 22.

The valve chamber-forming member 22 includes an upper wall element 24, a lower wall element 25 having a smaller diameter than the diameter of the upper wall element 24, and a bottom element 26 formed on the lower portion of the lower wall element 25. These elements are integrally formed to define the valve chamber 23. The valve chamber 23 has an upper chamber 23a in which the positive pressure valve 60 is received and a lower chamber 23b in which the negative pressure valve 70 is received. The valve chamber-forming member 22 has an opening 24a on the upper end thereof, which is covered with the inner cover 50. A slant plane 30a is formed between the upper wall element 24 and the lower wall element 25. One end of the slant plane 30a forms a seat member 30, on which the valve body 61 of the positive pressure valve 60 is seated.

The hollow portions 27 formed in the casing body 20 reduce the total wall thickness of the casing body 20 and decrease the contraction of resin in the vicinity of the seat member 30. This improves the dimensional accuracy of the seat member 30 and ensures the high sealing property of the seat member 30. The lowered mechanical strength of the casing body 20 due to the existence of the hollow portions 27 is compensated by the vertical joint members 29 which join the outer tubular body 21 with the valve chamber-forming member 22. The hollow portions 27 make the casing body 20 thin, shorten the time required for cooling and curing the resin, and shorten the molding cycle.

The inner cover 50 has a central recess 52 on the center of an inner cover body 51 and a cylindrical support member 53 formed along the circumference of the central recess 52. The cylindrical support member 53 is formed in a tubular shape to be inserted through the opening 24a of the valve chamber-forming member 22. The circumference of the inner cover body 51 forms an outer ring element 54 having four positioning ribs 57 arranged at equal intervals along the circumference. The positioning ribs 57 are projected downward to be inserted into the hollow portions 27 between the outer tubular body 21 and the valve chamber-forming member 22. The inner cover body 51 of the inner cover 50 also has a flow aperture 58 for connecting the valve chamber 23 with the atmosphere.

Figure 6:
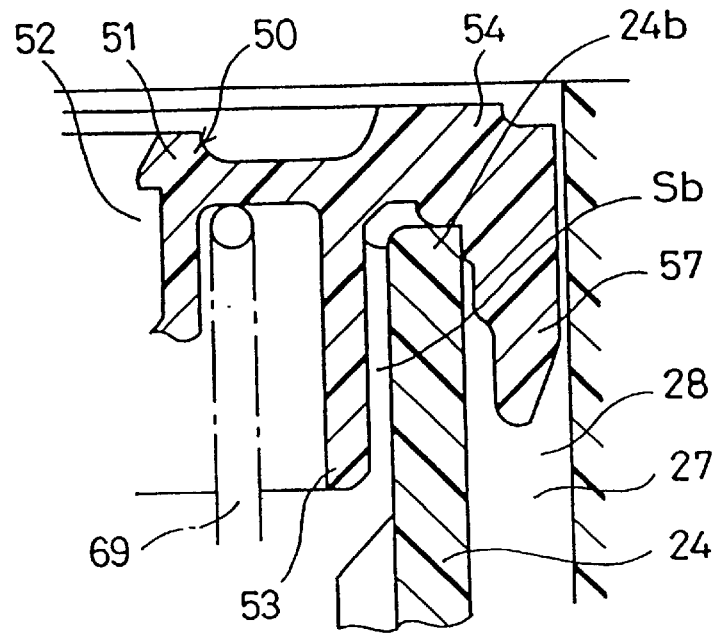
FIG. 6 is an enlarged sectional view showing an upper portion of the casing body.

The opening 24a of the valve chamber-forming member 22 is covered with the inner cover 50, which is welded to an upper peripheral portion 24b by ultrasonic welding. FIG. 6 is an enlarged sectional view showing the state in which the inner cover 50 is welded to the upper peripheral portion 24b, and FIG. 7 illustrates the state in which the inner cover 50 has not yet been welded to the upper peripheral portion 24b.

Figure 7:
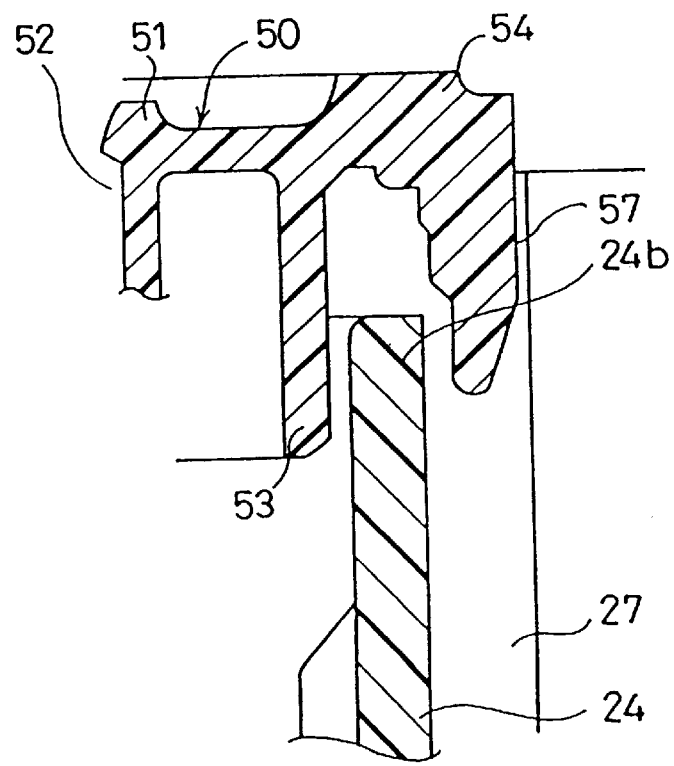
FIG. 7 is a sectional view showing the state before the inner cover is welded to the casing body.

Referring to FIGS. 6 and 7, the inner cover 50 is mounted on the upper peripheral portion 24b of the valve chamber-forming member 22. The positioning ribs 57 of the inner cover 50 are positioned and inserted into the hollow portions 27, so that the cylindrical support member 53 of the inner cover 50 is inserted into the upper chamber 23a. Thus, the inner cover 50 on the valve chamber-forming member 22 is positioned across a predetermined gap Sb from the inner wall surface of the valve chamber-forming member 22. This assembly can then be exposed to an energy source, such as, ultrasound, to fuse together the inner cover 50 and the valve chamber-forming member 22 together. For example, an ultrasonic horn is set on the inner cover 50 to provide ultrasonic vibrations. The ultrasonic vibration causes part of the resin to be fused and welded at the joint between the upper peripheral portion 24b and the inner cover 50. Part of the fused resin may flow out of the joint. Since the narrow gap Sb is formed between the valve chamber-forming member 22 and the cylindrical support member 53 of the inner cover 50, the fused resin flows through the gap Sb to be cooled and cured. Primarily the gap Sb between the inner wall surface of the valve chamber-forming member 22 and the cylindrical support member 53 functions as a flash trap. This construction effectively prevents the resin fused caused by, for example, ultrasonic welding from entering the valve chamber 23 or the positive pressure valve 60 and the negative pressure valve 70 and deteriorating the sealing property.

Figure 8:
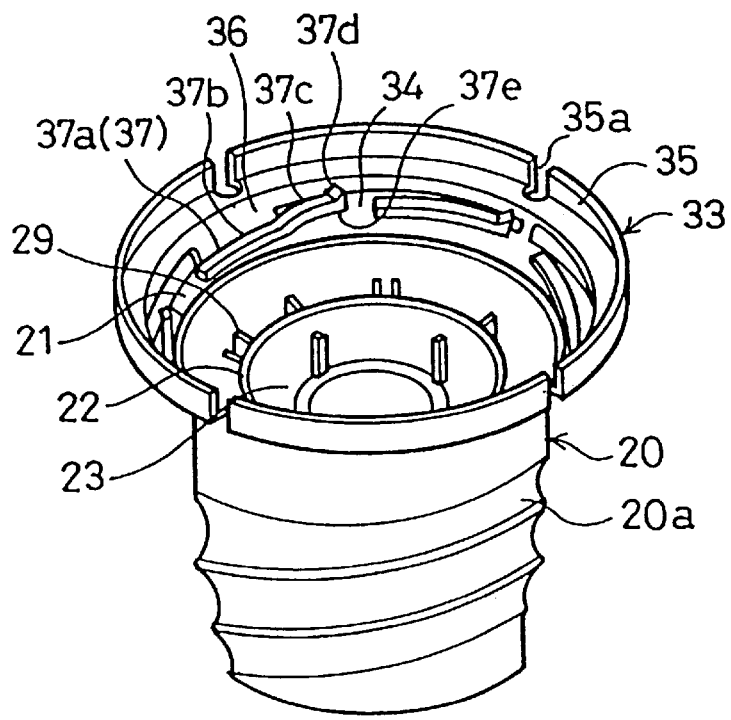
FIG. 8 is a perspective view illustrating the casing body.

FIG. 8 is a perspective view illustrating the casing body 20. A flange member 33 for supporting the cover member 40 (see FIG. 1) is formed on the upper circumference of the outer tubular body 21. The flange member 33 includes an inner ring member 34 formed on the outer tubular body 21, an outer ring member 35 disposed outside and slightly above the inner ring member 34, and four joint members 36 arranged along the circumference for connecting the inner ring member 34 with the outer ring member 35.

Figure 9:
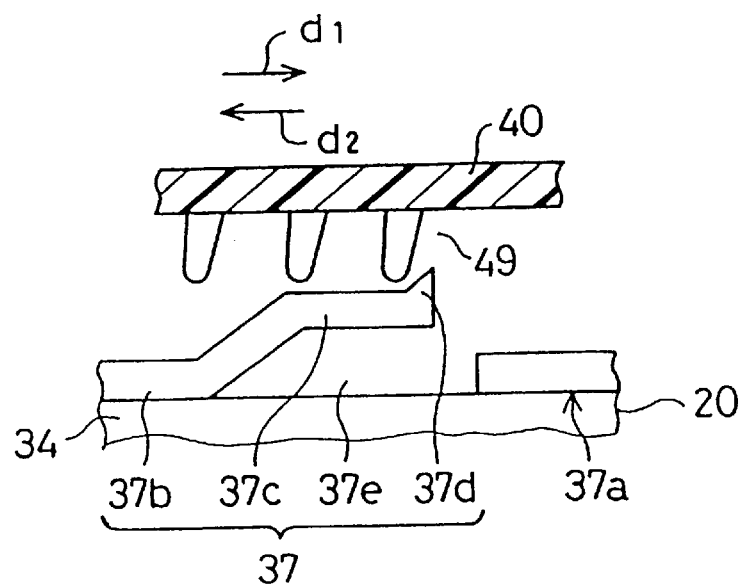
FIG. 9 shows an operation of a ratchet mechanism.

The inner ring member 34 has resilient claw elements 37a formed thereon. The resilient claw elements 37a and ratchet projections 49 (see FIG. 9) of the cover member 40 constitute a ratchet mechanism 37. The ratchet mechanism 37 allows a rotation of the cover member 40 only in one direction and, when the rotation causes a torque equal to or greater than a predetermined level, races the cover member 40, so as to prevent the fuel tank cap 10 from being excessively rotated in the closing direction. FIG. 9 shows engagement of the ratchet mechanism 37. Each resilient claw element 37a includes resilient piece 37c extending from a step element 37b on the inner ring member 34 and a click 37d formed on one end of the resilient piece 37c. The resilient piece 37c is held by the step element 37b to overhang the inner ring member 34 across a gap 37e. The ratchet projections 49 are slantly formed over the whole circumference of a top wall 41 of the cover member 40. The ratchet projections 49 are arranged circularly on the center portion of the top wall 41 to engage with the clicks 37d.

In the ratchet mechanism 37 thus constructed, the ratchet projection 49 going toward the click 37d in a clockwise direction d1 comes into contact with the click 37d at an obtuse angle. When the force is equal to or greater than a predetermined level at this moment, the ratchet projection 49 presses down and rides over the click 37d. This causes the cover member 40 to be rotated relative to the casing body 20. The ratchet projection 49 going toward the click 37d in a counterclockwise direction d2, on the other hand, comes into contact with the click 37d at an acute angle and can not ride over the click 37d. This causes the cover member 40 to be rotated integrally with the casing body 20.

The operation of the ratchet mechanism 37 is explained in the example of opening and closing the inlet FNb with the fuel tank cap 10. When a rotational force is applied in the clockwise direction d1 to the cover member 40 positioned at the inlet FNb, the cover member 40 is rotated integrally with the casing body 20 via the ratchet mechanism 37. The clicks 37d of the ratchet mechanism 37 engage with the ratchet projections 49, so that the torque of the cover member 40 is transmitted to the casing body 20 and the cover member 40 is rotated integrally with the casing body 20. The fuel tank cap 10 is accordingly screwed into the inlet FNb via the threads 20a and a one start screw (not shown). When the torque exceeding a predetermined level is applied to the cover member 40, that is, when the torque applied is greater than the torque required for screwing the fuel tank cap 10 into the filler neck FN, the clicks 37d slide against the ratchet projections 49. This causes the cover member 40 to be raced with respect to the casing body 20 and prevents the fuel tank cap 10 from being excessively rotated in the closing direction. When the user rotates the cover member 40 in the counterclockwise direction d2, the cover member 40 is rotated integrally with the casing body 20 via the ratchet mechanism 37, so that the fuel tank cap 10 is removed from the inlet FNb.

As shown in FIG. 8, the inner circumference of the flange member 33 forms the inner ring member 34, and the resilient claw elements 37a of the ratchet mechanism 37 are formed on the inner ring member 34. This means that the resilient claw elements 37a are disposed on the inner side of the flange member 33. This arrangement reduces contraction of the resin and realizes injection molding with the high dimensional accuracy. Namely this arrangement reduces the dimensional errors of the resilient claw elements 37a, makes the sliding torque of the cover member 40 substantially constant, and enables the ratchet mechanism 37 to work stably.

Figure 10:
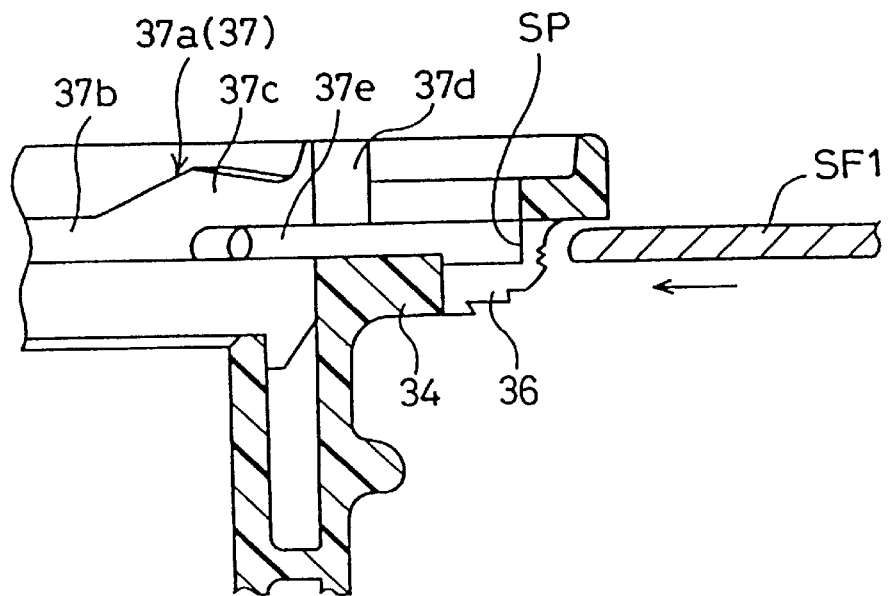
FIG. 10 shows a process of injection molding a resilient claw element of the ratchet mechanism.

Referring to FIG. 10, the joint members 36 of the flange member 33 extend outward and slightly upward from the outer circumference of the inner ring member 34. There is a space Sp between the joint members 36. The space Sp decreases the amount of the resin used for the flange member 33 to reduce the weight, and facilitates the manufacture of the ratchet mechanism 37. The position of the space Sp corresponds to the gap 37e of the resilient claw element 37a. In the process of injection molding the casing body 20, a slide mold SF1 is inserted through the space Sp, so that the gap 37e of the ratchet mechanism 37 can be provided readily.

Figure 11:
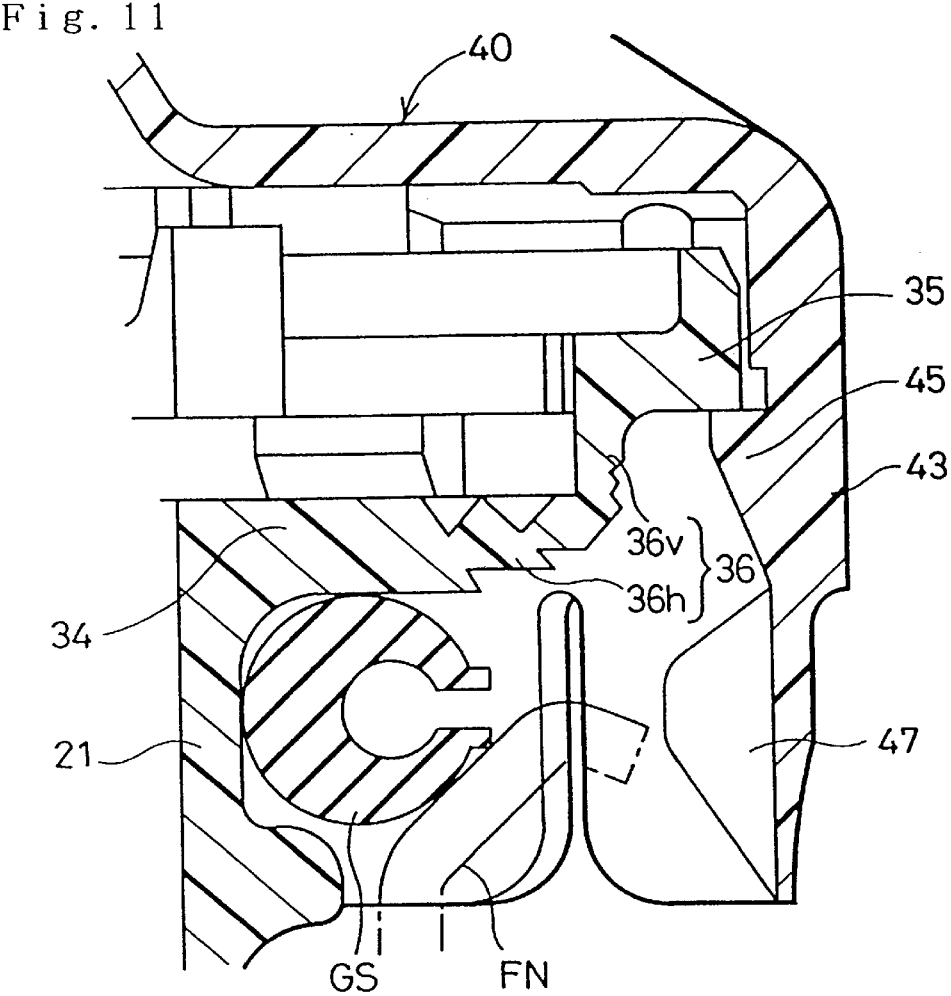
FIG. 11 is a sectional view illustrating a joint member for joining the upper of the casing body with the outer ring member.
Figure 12:
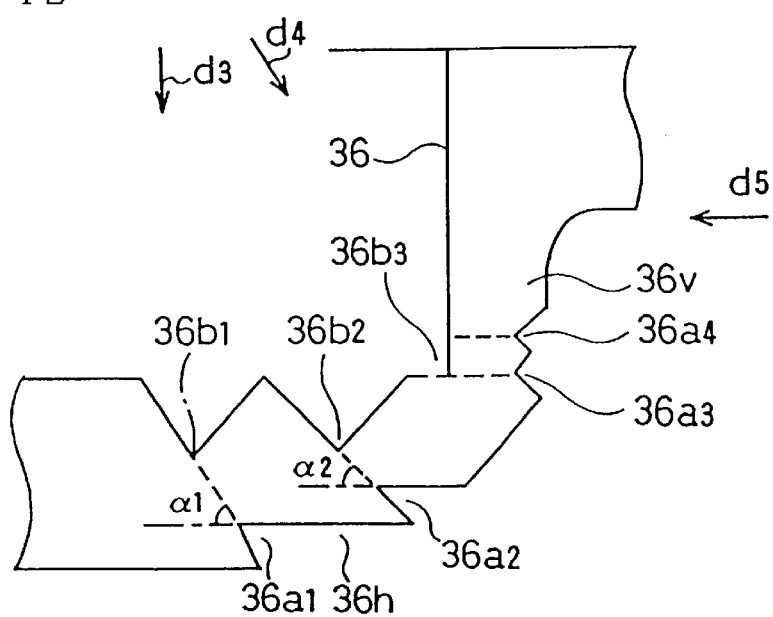
FIG. 12 shows the functions of the joint member.

FIG. 11 is an enlarged sectional view illustrating the joint member 36 of the flange member 33. As shown in FIG. 11, the joint member 36 has an L-shaped cross section including a horizontal element 36h and a vertical element 36v integrally formed with the horizontal element 36h. The joint member 36 has a fragile portion that is broken to separate the cover member 40 from the casing body 20 when an excessive external force is applied to the cover member 40, for example, due to deformation of an outer plate of the automobile (not shown). As shown in FIG. 12, V grooves are formed as notches 36a1 through 36a4 on the outer face of the joint member 36, whereas V grooves are formed as notches 36b1 through 36b3 on the inner face of the joint member 36. An angle (1 of the plane connecting the notch 36a1 with the notch 36b1 is set equal to 60 degrees, an angle (2 of the plane connecting the notch 36a2 with the notch 36b2 is equal to 45 degrees, and an angle (3 of the plane connecting the notch 36a3 with the notch 36b3 is equal to 0 degree, that is, in the diametral direction.

These notches form the fragile portion, on which the joint member 36 is broken and separated. When the cover member 40 receives an external force in a direction d3 (axial direction), a break starts from the notches 36a1 and 36b1 to separate the joint member 36 on the plane connecting the notches 36a1 and 36b1 with each other. When the cover member 40 receives an external force in a direction d4, a break starts from the notches 36a2 and 36b2 to separate the joint member 36 on the plane connecting the notches 36a2 and 36b2. When the cover member 40 receives an external force in a direction d5 (diametral direction), a break starts from the notches 36a3 and 36b3 to separate the joint member 36 on the plane connecting the notches 36a3 and 36b3 with each other.

The fragile portion is readily broken when an external force is applied to the joint member 36 of the flange member 33 in any one of the vertical direction d3, the slant direction d4, and the horizontal direction d5. This structure eliminates a scatter of the breaking load on the joint member 36, irrespective of the direction of the external force applied.

Figure 13:
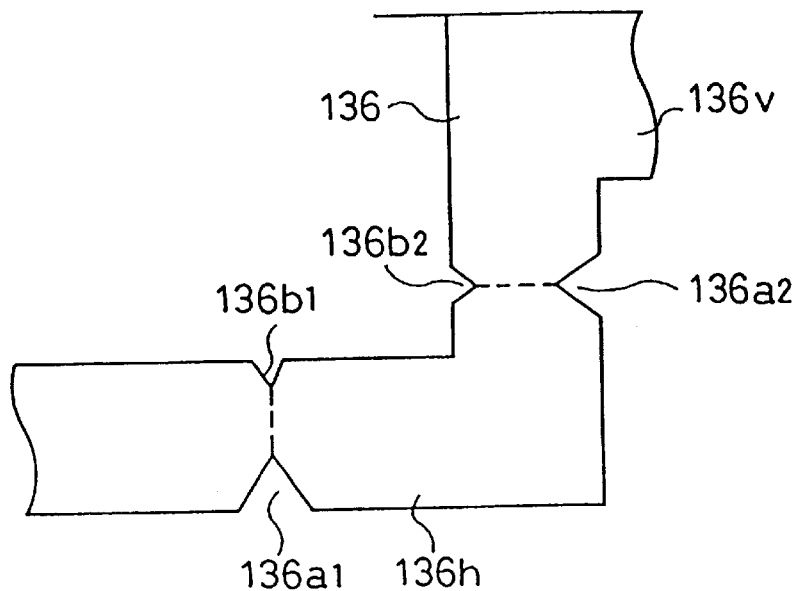
FIG. 13 shows one modification of the structure of FIG. 12.
Figure 14:
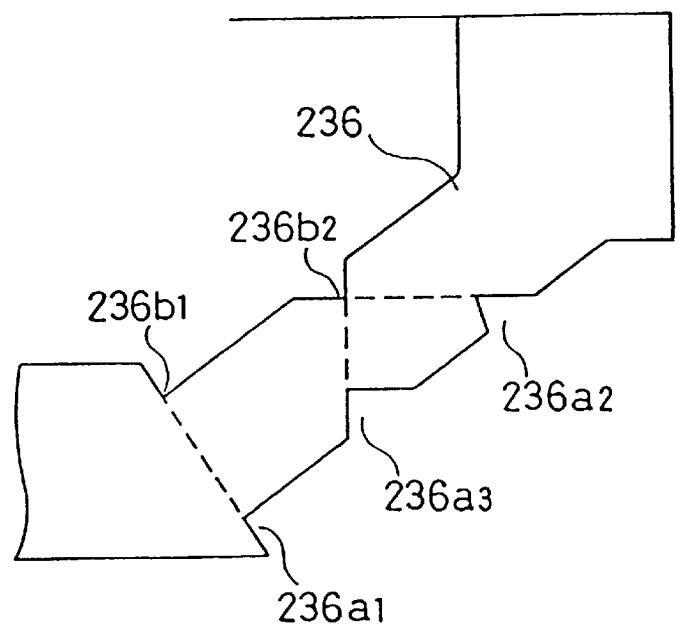
FIG. 14 shows another modification of the structure of FIG. 12.

FIGS. 13 and 14 show modifications of the structure of FIG. 12 having joint members of different shapes with notches at different positions. Referring to FIG. 13, a joint member 136 has an L-shaped cross section including a horizontal element 136h and a vertical element 136v integrally formed with each other. The horizontal element 136h has notches 136a1 and 136b1 constituting a first fragile portion, and the vertical element 136v has notches 136a2 and 136b2 constituting a second fragile portion. The first fragile portion and the second fragile portion are broken respectively on the planes connecting the corresponding notches to separate the joint member 136.

Referring to FIG. 14, a joint member 236 is arranged in an inclined orientation and has notches 236a1 and 236b1 constituting a first fragile portion and notches 236a2 and 236b2 constituting a second fragile portion. Another notch 236a3 is further formed between the notches 236a1 and 236a2, in order to facilitate the break of the second fragile portion. The joint member 236 may have any shape and arrangement as long as it has the first fragile portion and the second fragile portion.

Figure 15:
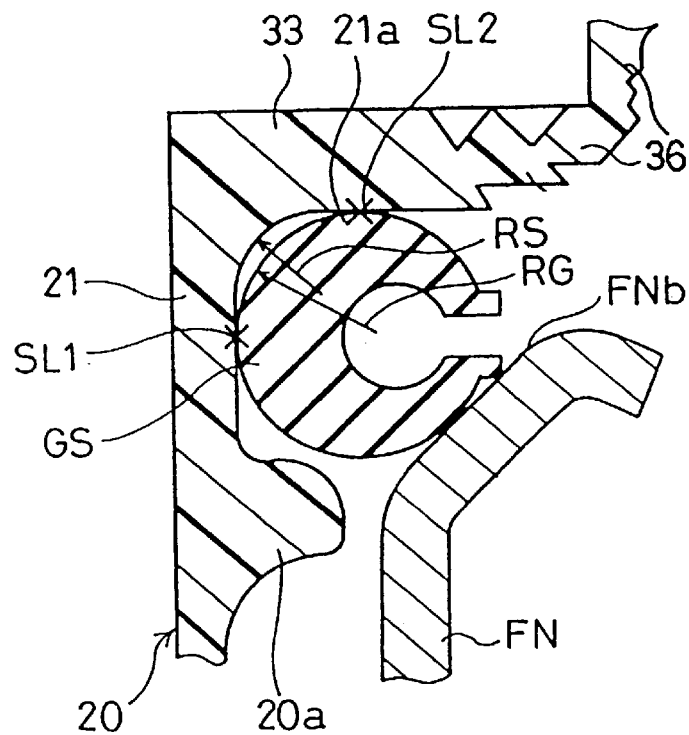
FIG. 15 illustrates a sealing structure of a gasket.

FIG. 15 is an enlarged sectional view illustrating an end of the flange member 33 of the outer tubular body 21. Referring to FIG. 15, the gasket GS is disposed below the flange member 33, and is interposed between the inlet FNb of the filler neck FN and the flange member 33. A seal support element 21a is formed on the lower periphery of the flange member 33. The seal support element 21a has a radius RS that is smaller than a radius RG of the outer circumferential surface of the gasket GS. Setting the radius RS of the seal support element 21a smaller than the radius RG of the gasket GS has the following effects on the sealing property.

When the fuel tank cap 10 is screwed into the inlet FNb, the gasket GS is pressed against the seal support element 21a and sealed at two sealing lines SL1 and SL2. In the conventional structure, the seal support element has the same radius as that of the gasket and is sealed along substantially the whole surface. Compared with this conventional structure, the structure of the embodiment has the greater sealing force at both the sealing lines SL1 and SL2 and ensures the high sealing property between the fuel tank and the atmosphere.

Figure 16:
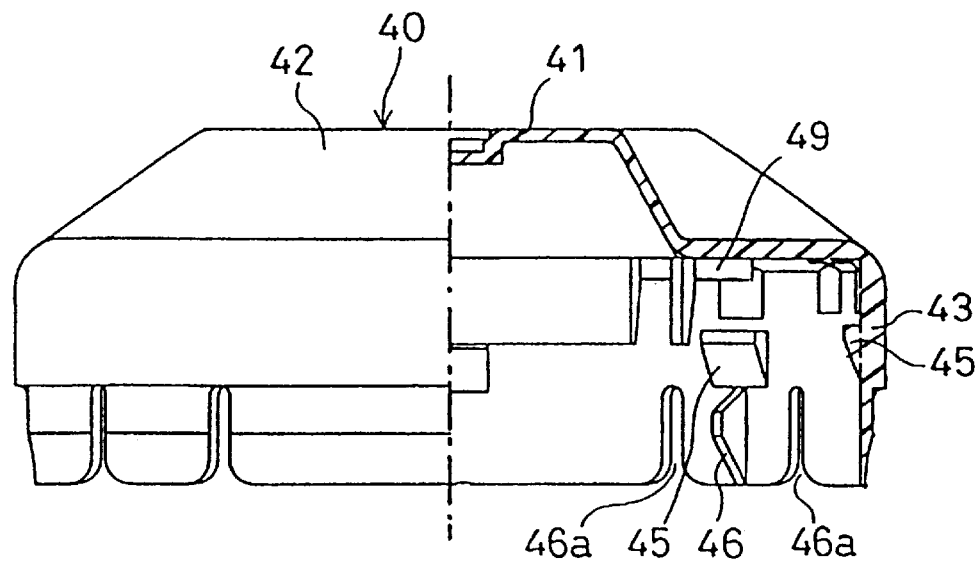
FIG. 16 is a half sectional view illustrating a cover member.
Figure 17:
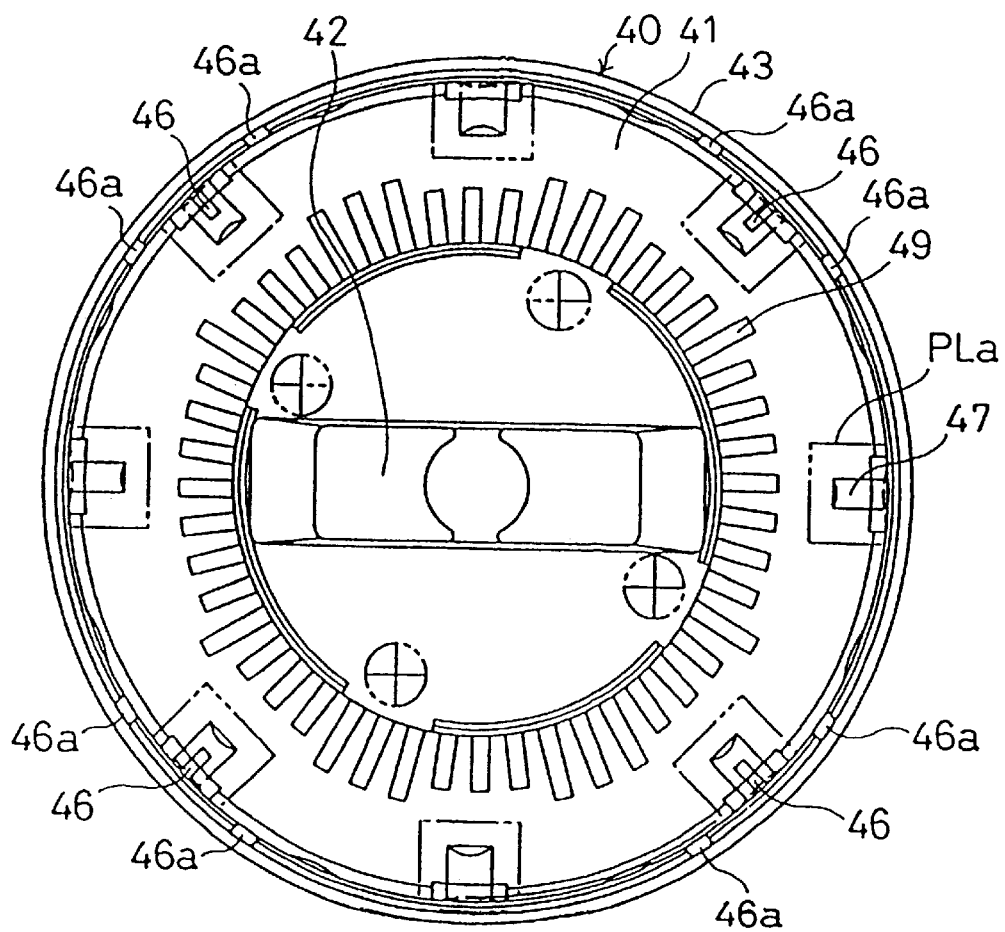
FIG. 17 is a bottom view illustrating the cover member.
Figure 18:
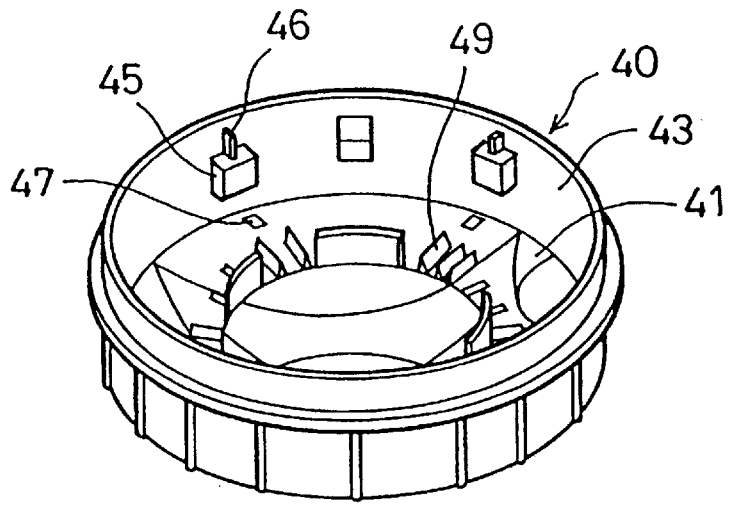
FIG. 18 is a perspective view illustrating the cover member 40.

FIG. 16 is a half sectional view illustrating the cover member 40, FIG. 17 is a bottom view of the cover member 40, and FIG. 18 is a perspective view of the cover member 40. The cover member 40 is detachably attached to the flange member 33. The cover member 40 includes a top wall 41, a handle member 42 projected from the top wall 41, and a side wall 43 extending from the outer circumference of the top wall 41. The cover member 40 is composed of a conductive resin and integrally formed by injection molding. Eight fitting projections 45 are projected inside the side wall 43. The fitting projections 45 are fitted in the outer ring member 35 of the flange member 33, so that the cover member 40 is attached to the casing body 20 via the flange member 33.

Figure 19:
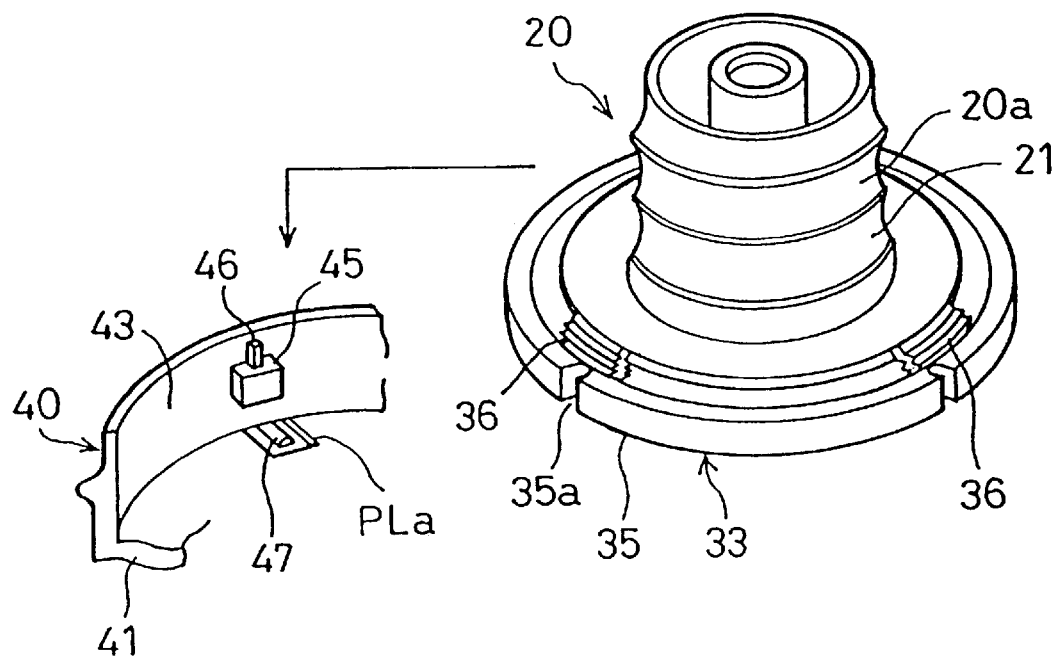
FIG. 19 shows a process of attaching the cover member to the casing body.

The cover member 40 is assembled to the casing body 20 in the following manner. As shown in FIG. 19, the opening of the cover member 40 is positioned on the outer ring member 35 of the casing body 20, and the cover member 40 is pressed into the casing body 20. The fitting projections 45 of the cover member 40 then come into contact with the outer ring member 35 having slits 35a. The slits 35a slightly deform the outer ring member 35 in an elastic manner when the outer ring member 35 rides over the fitting projections 45. The elastic deformation of the outer ring member 35 enables the outer ring member 35 to readily ride over the fitting projections 45, so as to attach the cover member 40 to the casing body 20. The deformation of the outer ring member 35 facilitates the attachment of the cover member 40 to the casing body 20.

As shown in FIG. 19, a discharge projection 46 for discharging the static electricity to the filler neck FN is formed on each fitting projection 45. When the user who is electrostatically charged manually touches the cover member 40 in a dried atmosphere, the static electricity is discharged between the discharge projections 46 of the cover member 40 and the filler neck FN. This causes the static electricity to be grounded to the filler neck FN and prevents the user from receiving a shock from the static electricity when removing the fuel tank cap 10. The discharge projection 46 is formed integrally with the fitting projection 45. The long and narrow discharge projection 46 is accordingly molded easily and reinforced by the fitting projection 45 to have a sufficiently large mechanical strength. The discharge projections 46 have the following function when the cover member 40 is attached to the casing body 20. The discharge projections 46 are positioned in the slits 35a of the outer ring member 35 when the cover member 40 is pressed into the casing body 20. This enables the discharge projections 46 to be guided by the slits 35a and further facilitates the attachment of the cover member 40 to the casing body 20.

Figure 20:
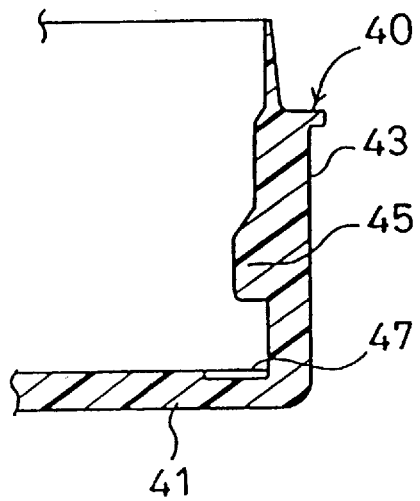
FIG. 20 is a sectional view illustrating a fitting projection of the cover member.
Figure 21:
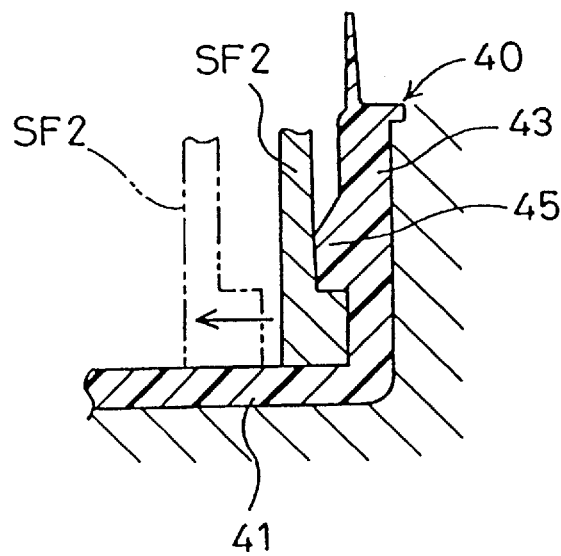
FIG. 21 shows a process of injection molding the fitting projection of the cover member.

As shown in FIGS. 19 and 20, anti-shaving projections 47 are further formed on the top wall 41 of the cover member 40. The anti-shaving projections 47 are formed at the positions corresponding to the fitting projections 45 on the side wall 43. The anti-shaving projection 47 is arranged on the approximate center of a parting line PLa and has substantially the same height as that of the parting line PLa. The anti-shaving projections 47 prevent the parting line PLa from being slid against the outer ring member 35 of the cover member 40 and shaved. FIG. 21 shows the state of injection molding the fitting projection 45 and the peripheral elements of the cover member 40. A slide mold SF2 is used for injection molding since the fitting projection 45 is protruded from the side wall 43 and undercut in injection molding. The slide mold SF2 is arranged to be slidable in the direction of the arrow in FIG. 21 and forms its trace as the parting line PLa of the top wall 41. The anti-shaving projections 47 having substantially the same height as that of the parting line PLa cause the outer ring member 35 to slide thereon and effectively prevent the parting line PLa from being slid against the outer ring member 35 and shaved to resin powder, when the cover member 40 is rotated relative to the casing body 20 via the ratchet mechanism 37.

Figure 22:
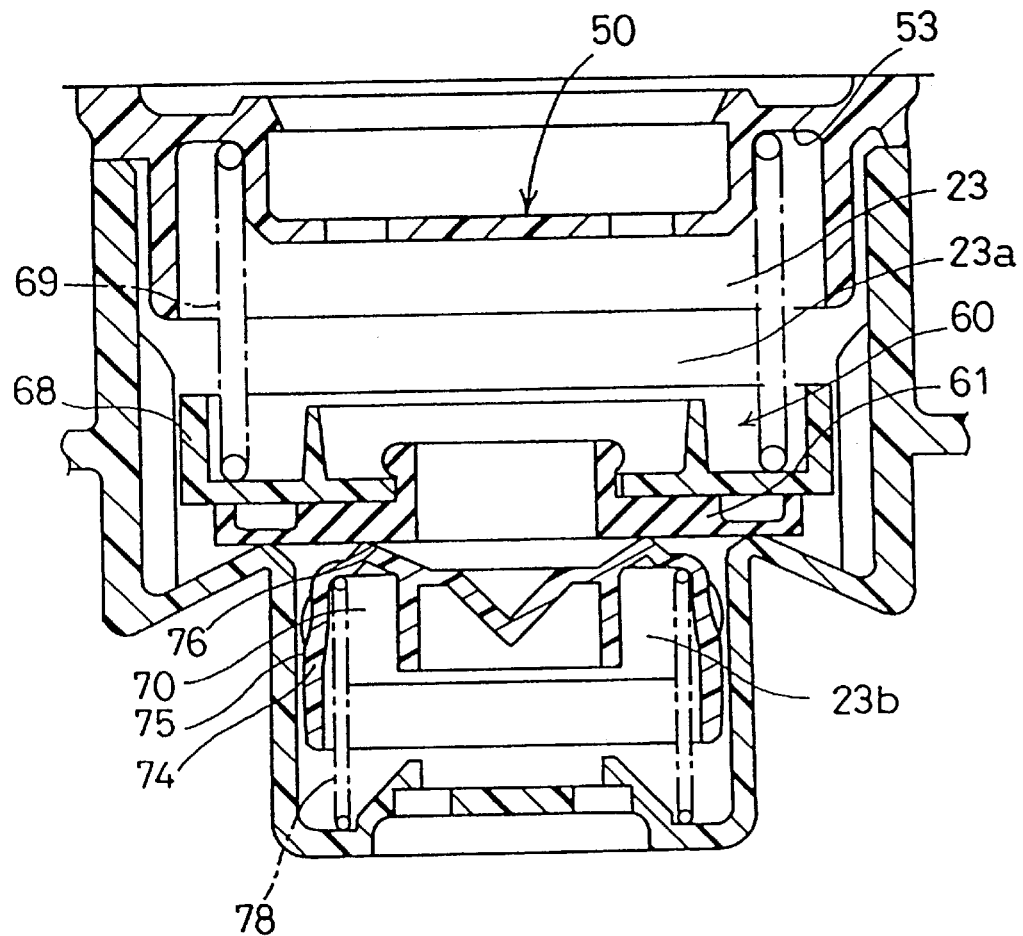
FIG. 22 is a sectional view illustrating a positive pressure valve and a negative pressure valve in the casing body.
Figure 23:
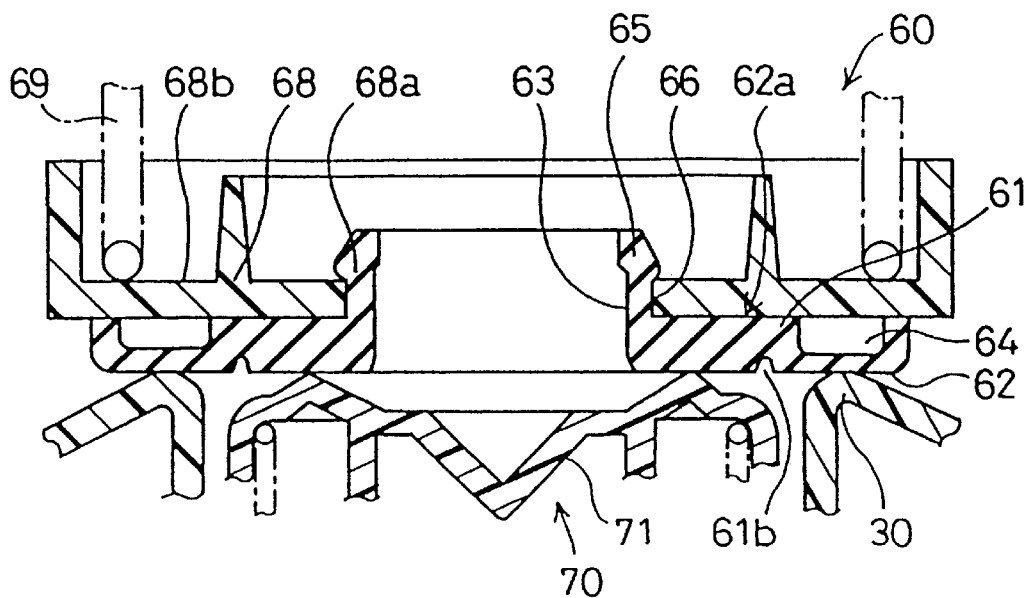
FIG. 23 is a sectional view illustrating the positive pressure valve.

The following describes the positive pressure valve 60 and the negative pressure valve 70 received in the valve chamber 23. FIG. 22 is an enlarged sectional view illustrating the positive pressure valve 60 and the negative pressure valve 70. The positive pressure valve 60 is disposed in the upper chamber 23a of the valve chamber 23, and the negative pressure valve 70 in the lower chamber 23b. FIG. 23 is an enlarged sectional view illustrating the positive pressure valve 60.

The positive pressure valve 60 includes the valve body 61 composed of, for example, fluororubber, the valve support member 68, and the coil spring 69. The valve body 61 is a disc having a lower seat surface 62 and a fitting member 65 with a valve flow hole 63 on the center thereof. The fitting member 65 has a side supporting recess 66 formed in the side wall thereof. The valve body 61 is attached to the valve support member 68 by fitting the fitting member 65 into a fitting aperture 68a of the valve support member 68. A spring support element 68b is formed on the upper surface of the valve support member 68. The spring support element 68b supports one end of the coil spring 69, whereas the other end of the coil spring 69 is supported by the cylindrical support member 53 of the inner cover 50 (FIG. 22). Namely the coil spring 69 is held between the inner cover 50 and the valve support member 68.

The positive pressure valve 60 thus constructed controls the pressure in the fuel tank in the following manner. In the state that the fuel tank cap 10 is attached to the filler neck FN, when the tank pressure increases to exceed a predetermined level, the valve body 61 and the valve support member 68 lift up against the pressing force of the coil spring 69, and the fuel tank is connected to the atmosphere via the valve chamber 23. When the connection returns the pressure in the fuel tank to or below the predetermined level, the valve body 61 is pressed down by the pressing force of the coil spring 69 and closed. The valve body 61 opens and closes in this manner, to make the differential pressure applied thereto not greater than the predetermined level.

A rear face 62a of the valve body 61 is supported by the lower face of the valve support member 68. A ring recess 64 is formed in the outer circumferential portion of the valve body 61. A ring groove 61b is formed in the seat surface 62 of the valve body 61 and located inside the ring recess 64.

Figure 24:
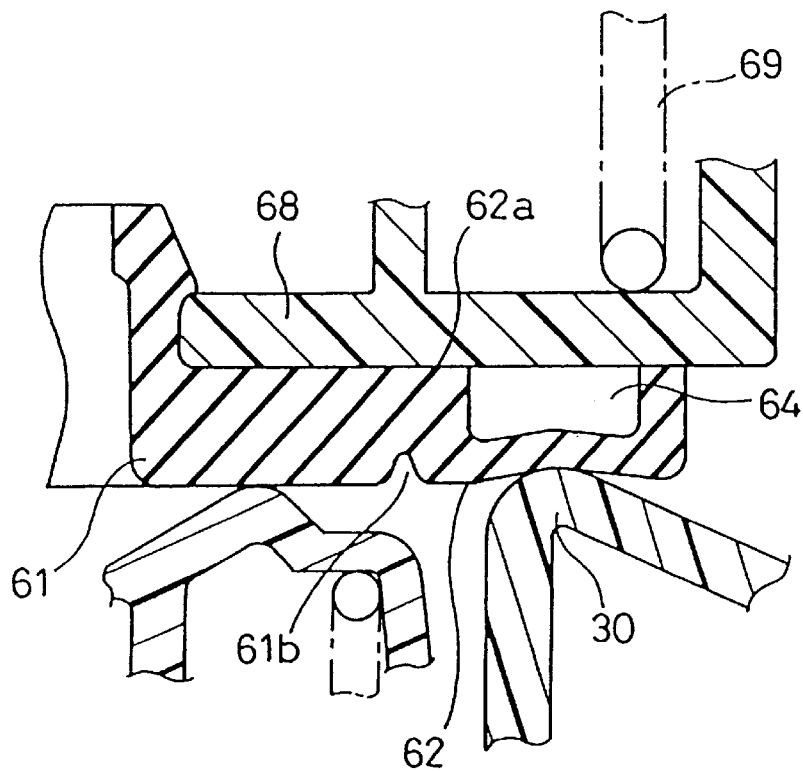
FIG. 24 shows functions of a ring groove of the positive pressure valve.

The ring recess 64 and the ring groove 61b have the following functions and effects. When the valve body 61 of the positive pressure valve 60 is moved from the open position in the closing direction by the pressing force of the coil spring 69 as shown in FIG. 24, the seat surface 62 of the valve body 61 comes into contact with the seat member 30. The seat member 30 is thus in contact with the center of the seat surface 62 having the ring recess 64. Since the valve body 61 has a thin wall at the ring recess 64, the seat surface 62 is deformed by the seat member 30.

When the seat surface 62 is pressed against the seat member 30, the valve body 61 is seated onto the seat member 30 while keeping the horizontal attitude and being supported by the valve support member 68 on both the inner circumferential side and the outer circumferential side of the ring recess 64. The seat surface 62 is in line contact with the ridge of the seat member 30 and is seated not in the inclined attitude but in the horizontal attitude, thereby ensuring high sealing property. The small contact area between the seat surface 62 and the seat member 30 realizes the ideal valve-opening characteristic, that is, an abrupt rise in the open position. The ring groove 61b is formed in the seat surface 62 of the valve body 61 to equalize the deflection in the vicinity of the ring recess 64 of the seat surface 62, thereby further improving the sealing property.

Figure 25:
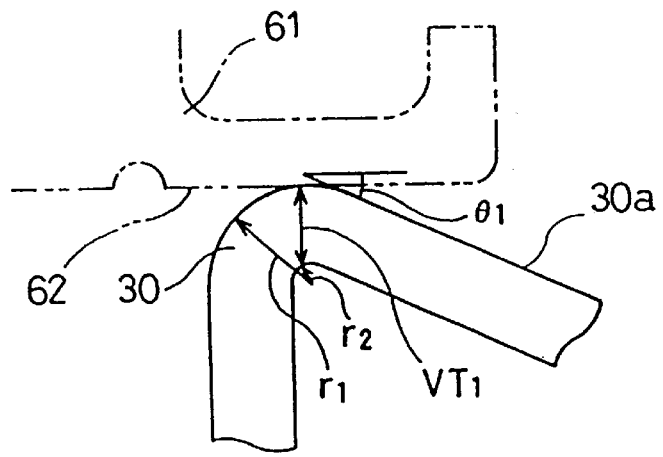
FIG. 25 illustrates functions of a seat member of the casing body.

The seat member 30 of the casing body 20 has the shape discussed below. As shown in FIG. 25, the seat member 30 is formed on the apex of an acute angle with respect to the seat surface 62 of the valve body 61. This structure enables a line contact in the sealed position and improves the sealing property. An angle (1 of the slant plane 30a of the seat member 30 is set equal to 25 degrees, in order to exert the following effects.

Figure 26:
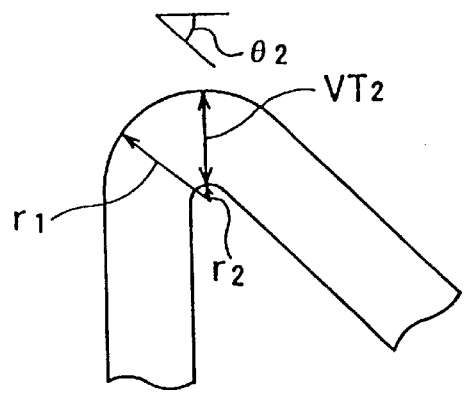
FIG. 26 further illustrates the function of the seat member of the casing body.

A radius r1 of the seat member 30 is a critical design feature required to achieve the high sealing property of the present invention. When the seat member 30 has the radius r1, the comparison of the case where the angle $\theta 1=25$ degrees with the case where the angle $\theta 1=45$ degrees as shown in FIG. 26. Because of the limit of resin molding, there is substantially no difference in a radius r2 between these two cases. The seat member 30 accordingly has a wall thickness VT1 in the case of the angle $\theta 1=25$ degrees and a wall thickness VT2 in the case of the angle $\theta 1=45$ degrees, where VT1 is less than VT2. The smaller angle $\theta 1$ of the seat member 30 reduces its wall thickness VT1 and decreases the sink mark due to the resin contraction. This increases the plane accuracy of the seat member 30 and improves the sealing property.

Figure 27:
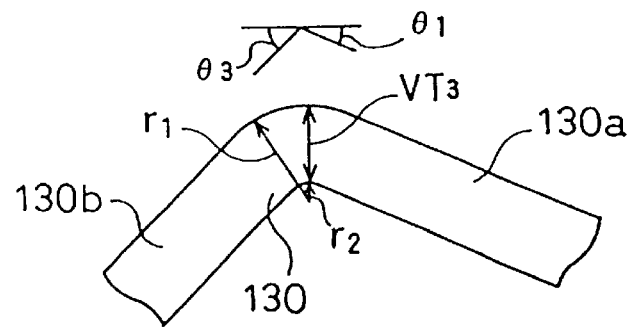
FIG. 27 shows one modification of the structure of FIG. 25.

FIG. 27 is a sectional view illustrating a modified structure of the seat member 30 shown in FIG. 25. In the structure of FIG. 27, a seat member 130 has a first slant plane 130a and a second slant plane 130b formed on either side thereof. The first slant plane 130a has an angle θ1=25 degrees and the second slant plane 130b has an angle θ3=45 degrees; that is, the angle between the two slant planes is 110 degrees. When the radii r1 and r2 of the seat member 130 are fixed to given values, the greater angle of the second slant plane 130b reduces a wall thickness VT3 and further improves the plane accuracy of the seat member 130.

Figure 28:
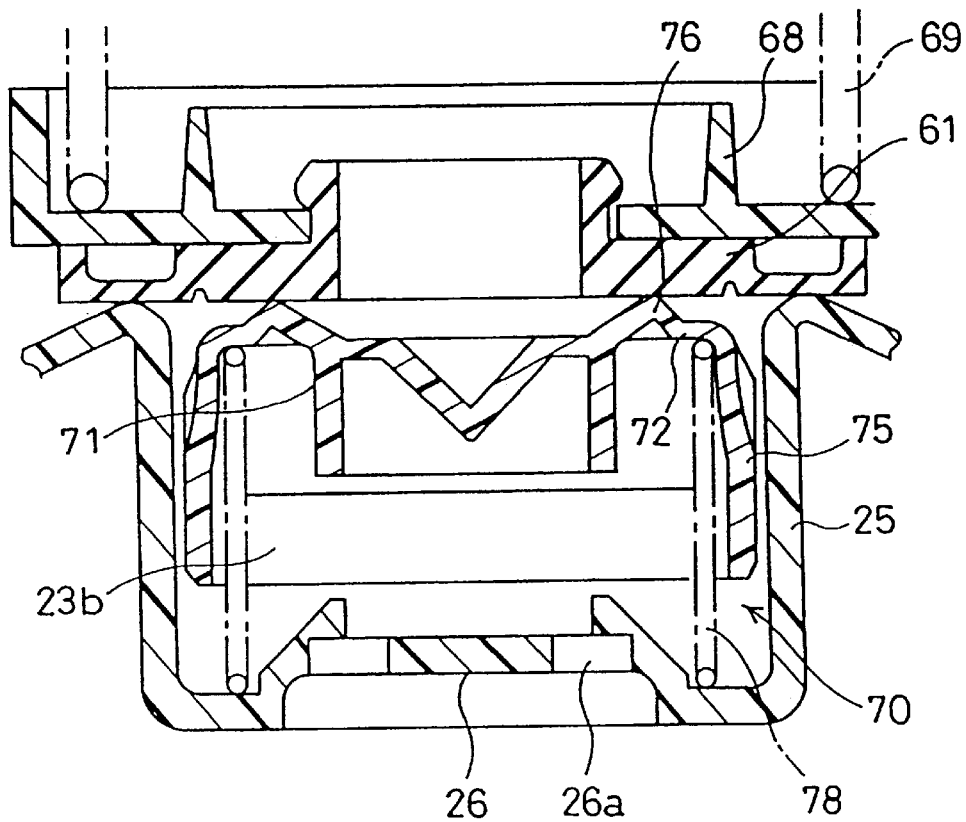
FIG. 28 is a sectional view illustrating the negative pressure valve 70.
Figure 29:
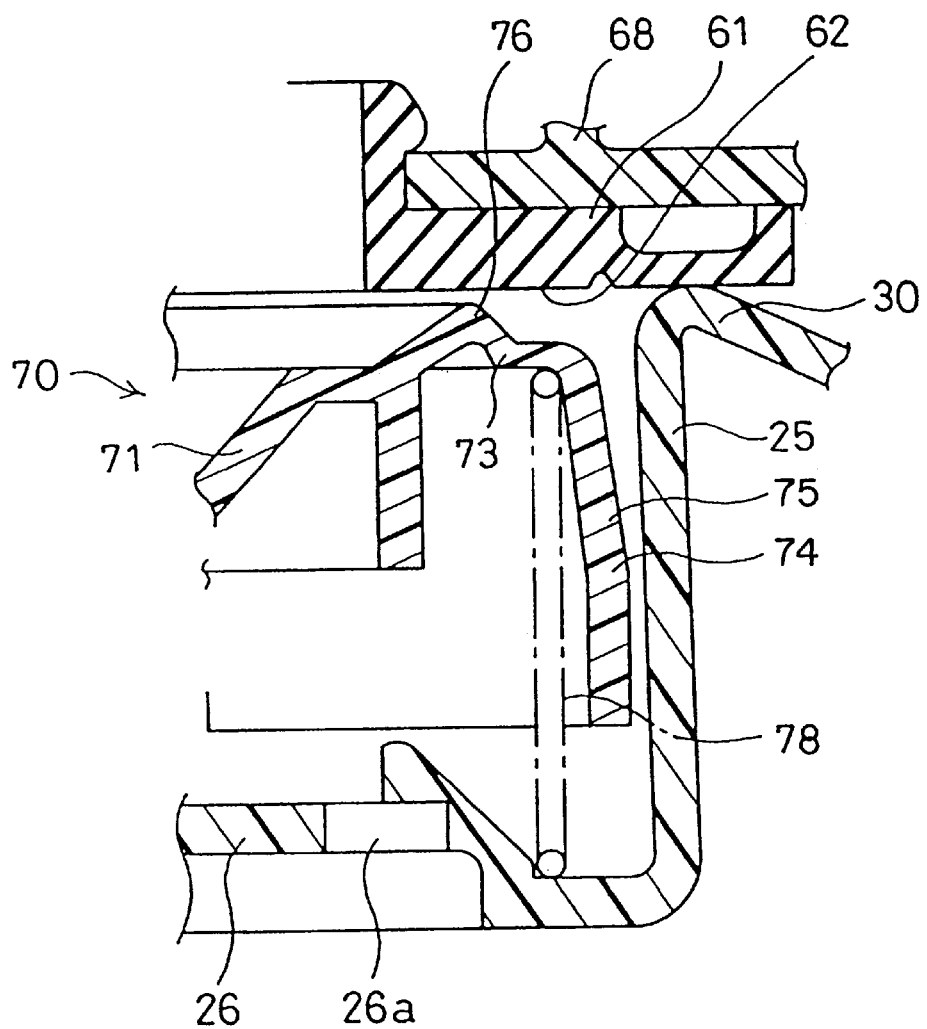
FIG. 29 shows functions of a tapered element 75 the negative pressure valve.

FIG. 28 is a sectional view illustrating the negative pressure valve 70, and FIG. 29 is an enlarged sectional view illustrating an essential part of the negative pressure valve 70. The negative pressure valve 70 includes the valve body 71 composed of a resin, and the coil spring 78 spanned between a spring support step 72 of the valve body 71 and the bottom element 26 for pressing the valve body 71. A seat member 76 extends upward from the valve body 71 to be seated on and separated from the valve body 61 of the positive pressure valve 60.

The negative pressure valve 70 works in the following manner. When the fuel tank has the negative pressure relative to the atmospheric pressure and the differential pressure applied to the valve body 71 becomes equal to or greater than a predetermined level, the valve body 71 moves downward against the pressing force of the coil spring 78 as shown in FIG. 29. The valve body 71 is accordingly separated from the seat surface 62 of the valve body 61. At this moment, the valve body 61 is seated on the seat member 30. In that state, a passage is made between the valve body 71 and the valve body 61. The fuel tank is thus connected to the atmosphere via the passage between the valve body 71 and the lower wall element 25 and a connection aperture 26a of the bottom element 26. This cancels the state of negative pressure in the fuel tank. When the differential pressure applied to the valve body 71 is less than the pressing force of the coil spring 78, the valve body 71 is closed.

Figure 30:
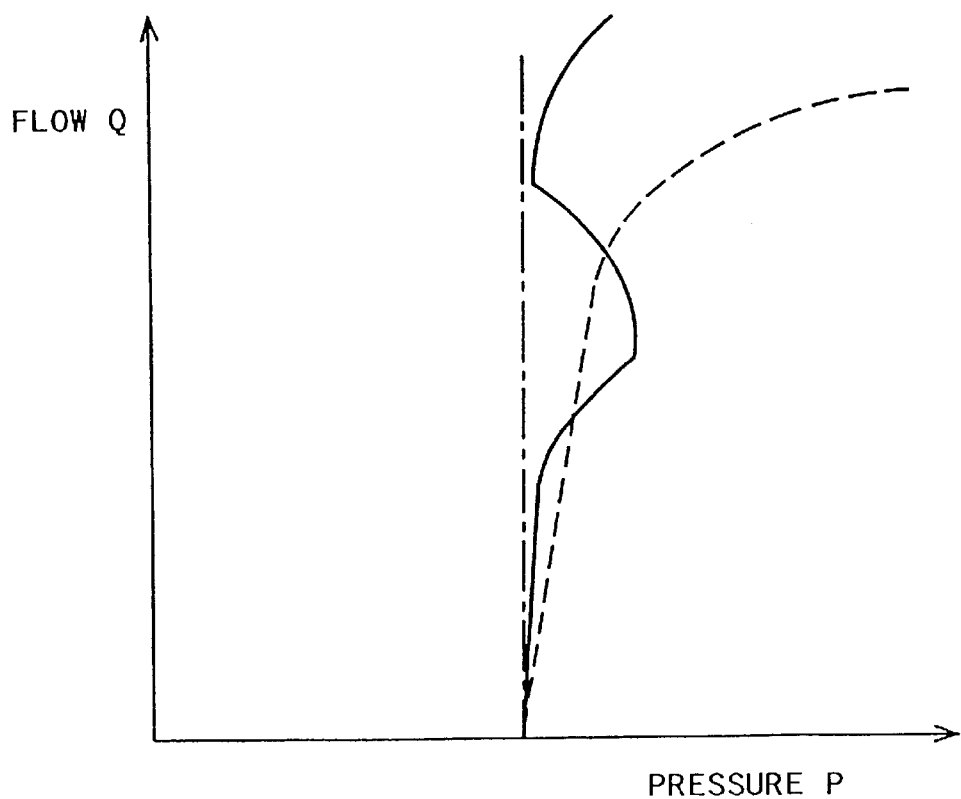
FIG. 30 is a graph showing the relationship between the flow and the pressure of the negative pressure valve.

As shown in FIG. 29, the valve body 71 of the negative pressure valve 70 has a tapered element 75 on an outer circumferential member 74. The tapered element 75 is tapered to make the distance from the lower wall element 25 of the valve chamber-forming member 22 gradually narrower. The tapered arrangement enables the negative pressure valve 70 to have the flow property shown in FIG. 30. FIG. 30 shows the relationship between the differential pressure and the flow Q, where the solid line shows data of the negative pressure valve 70 of the embodiment and the broken line shows data of a comparative example corresponding to a known pressure valve.

It is preferable that the negative pressure valve 70 has the property of abruptly increasing the flow Q as shown by the one-dot chain line, in order to keep the pressure in the fuel tank within a predetermined range. Whereas the flow Q gradually increases with an increase in differential pressure in the comparative example, the flow Q abruptly increases in the negative pressure valve 70 of the embodiment, which is close to the ideal flow property. The tapered arrangement of the tapered element 75 of the negative pressure valve 70 increases the differential pressure applied to the valve body 71 and thereby abruptly increases the valve-opening force.

Referring back to FIG. 28, the connection aperture 26a is formed in the bottom element 26 of the casing body 20. The connection aperture 26a is arranged apart from the sealed portion of the valve body 71, that is, close to the center of the bottom element 26. Even when the fuel contaminated with foreign matters flows through the connection aperture 26a into the lower chamber 23b, the position of the connection aperture 26a enables the fuel to hit against the valve body 71 and be returned to the fuel tank through the connection aperture 26a. This prevents foreign matter present in the fuel from entering the sealed portion of the valve body 71. The foreign matters accordingly do not interfere with the opening and closing operations of the valve body 71 nor damage the sealing property.

Figure 31:
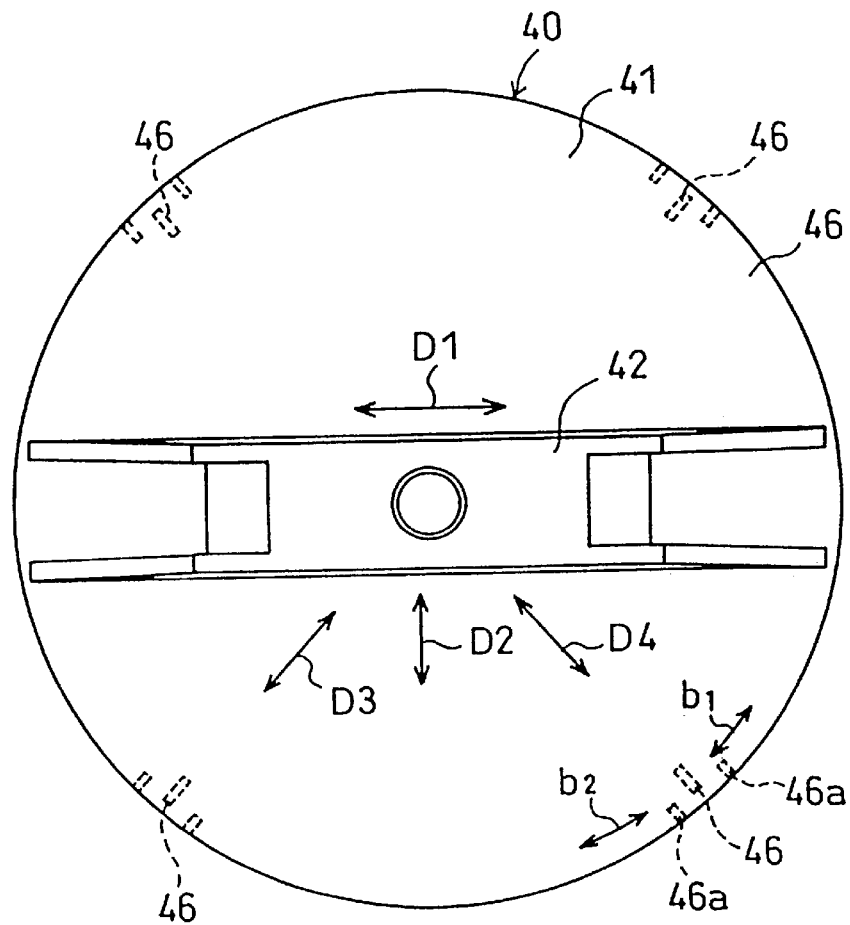
FIG. 31 is a plan view illustrating the cover member.
Figure 32:
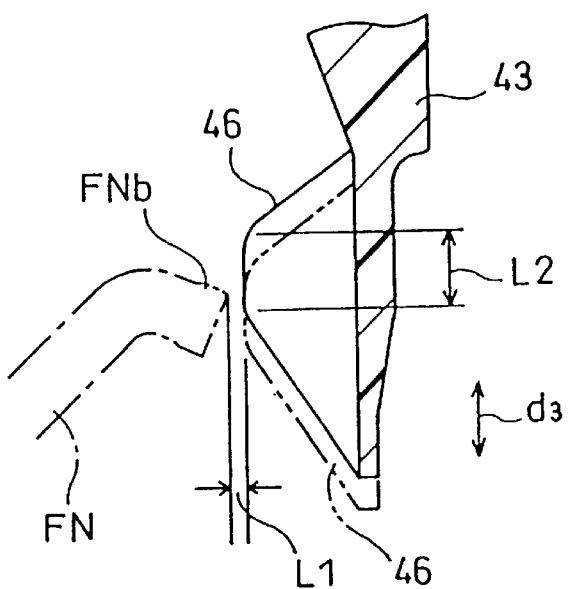
FIG. 32 is an enlarged sectional view illustrating a discharge projection formed on the circumference of the cover member.

FIG. 31 is a plan view illustrating the cover member 40, and FIG. 32 is an enlarged sectional view showing the lower end portion of the cover member 40. As shown in FIGS. 31, 32, 16, and 17, the four discharge projections 46 for discharging the static electricity to the filler neck FN are formed on the inner surface of the side wall 43 of the cover member 40 to be arranged at the interval of 90 degrees along the circumference. When the user who is electrostatically charged manually touches the cover member 40 in a dried atmosphere, the static electricity is discharged between the discharge projections and the filler neck FN and grounded to the filler neck FN.

The conditions of electric discharge whereby the user is not shocked when removing the fuel tank cap 10 are: (1) that discharge of electricity is securely performed irrespective of the closing state of the fuel tank cap 10; and (2) that discharge of electricity proceeds gently and does not cause a large shock. The discharge projections 46 have the following structure in order to satisfy these conditions.

(1) As shown in FIG. 32, the discharge projections 46 are projected in the axial direction, and a discharge distance L1 from the filler neck FN is set to be not greater than about 1 mm or preferably not greater than about 0.85 mm. When the discharge distance L1 is greater than about 1 mm the break voltage increases and the gentle discharge characteristics are not obtained.

(2) The discharge projections 46 are formed as long and narrow projections in an opening-closing direction d3 of the fuel tank cap 10, that is, in the axial direction. In response to the opening or closing operation of the fuel tank cap 10, the cover member 40 moves integrally with the casing body 20 relative to the filler neck FN in the opening-closing direction d3. The discharge projections 46 also move in the same direction, and the discharge distance L1 from the end of the inlet FNb of the filler neck FN is constant in the range of a length L2 in the axial direction. Namely the discharge distance L1 is allowed to be constant in the range of the length L2 irrespective of the closing state of the fuel tank cap 10. This ensures the stable discharge characteristics.

Figure 33:
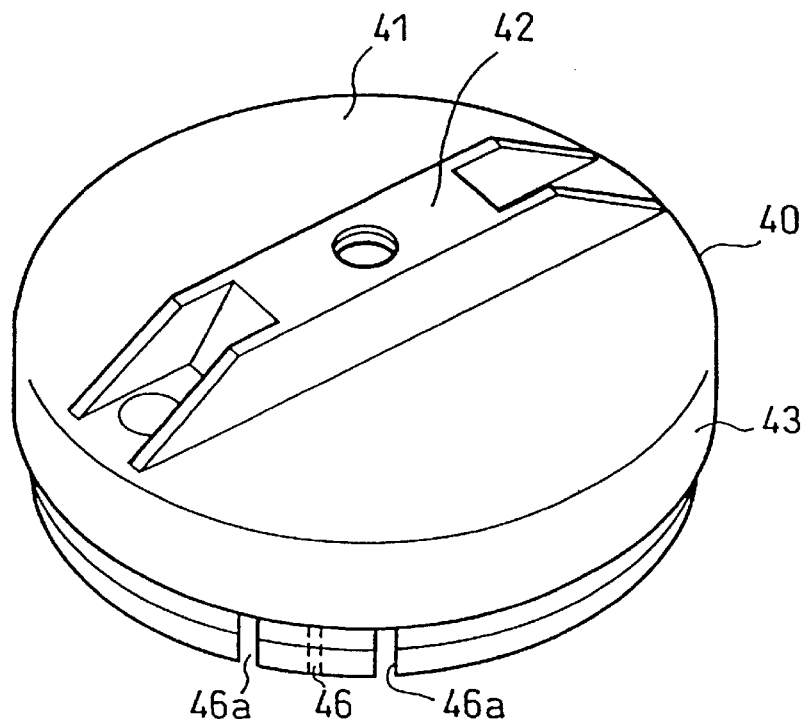
FIG. 33 is a perspective view illustrating the cover member.

(3) As shown in FIG. 31, the discharge projections 46 are arranged at the angle of 45 degrees with respect to the handle member 42 of the cover member 40. This arrangement is ascribed to the following reason. As shown in FIGS. 31 and 33, the handle member 42 of the cover member 40 is projected from the top wall 41 and injection molded to have the maximum resin contraction in a radial direction D1 and the minimum resin contraction in another radial direction D2, which is perpendicular to the radial direction D1. If the discharge projections 46 are arranged in the radial directions D1 and D2, the discharge distance from the filler neck FN is varied to change the discharge characteristics. The discharge projections 46 are accordingly arranged in radial directions D3 and D4 of 45 degrees, which give the intermediate resin contraction between those in the radial directions D1 and D2. Namely the four discharge projections 46 are arranged concentrically with the center of the cover member 40. Irrespective of the closing state of the fuel tank cap 10, the four discharge projections 46 are arranged on the same circle about the center of the cover member 40. This makes the discharge distance from the end of the filler neck FN constant and ensures stable discharge characteristics.

(4) As shown in FIGS. 16, 31, and 33, discharge slits 46a having substantially the same length as that of the discharge projection 46 are formed on both sides of each discharge projection 46. The discharge slits 46a separate the forces in the directions of arrows b1 and b2 accompanied by the resin contraction in the first and the second radial directions D1 and D2, thereby reducing the effect of resin contraction on the discharge projection 46 and decreasing the variation in discharge distance L1.

(5) The volume resistivity of the cover member 40 is about $10^4$ to about $10^9$ Ωcm. The volume resistivity at the site of the discharge projections 46 is lower than the other portions of the cover member 40. The upper limit of the volume resistivity is set to be not greater than about $10^9$ Ωcm to ensure the electrical conductivity, whereas the lower limit is set to be not less than about $10^4$ Ωcm to prevent the voltage between the discharge projection 46 and the filler neck FN from increasing abruptly. The lower volume resistivity at the site of the discharge projections 46 enables the static electricity in the cover member 40 to be quickly led to the discharge projections 46. The discharge projections 46 enable the static electricity in the cover member 40 to be gently discharged and grounded via the filler neck FN, without causing an abrupt increase in voltage between the discharge projections 46 and the filler neck FN.

Figure 34:
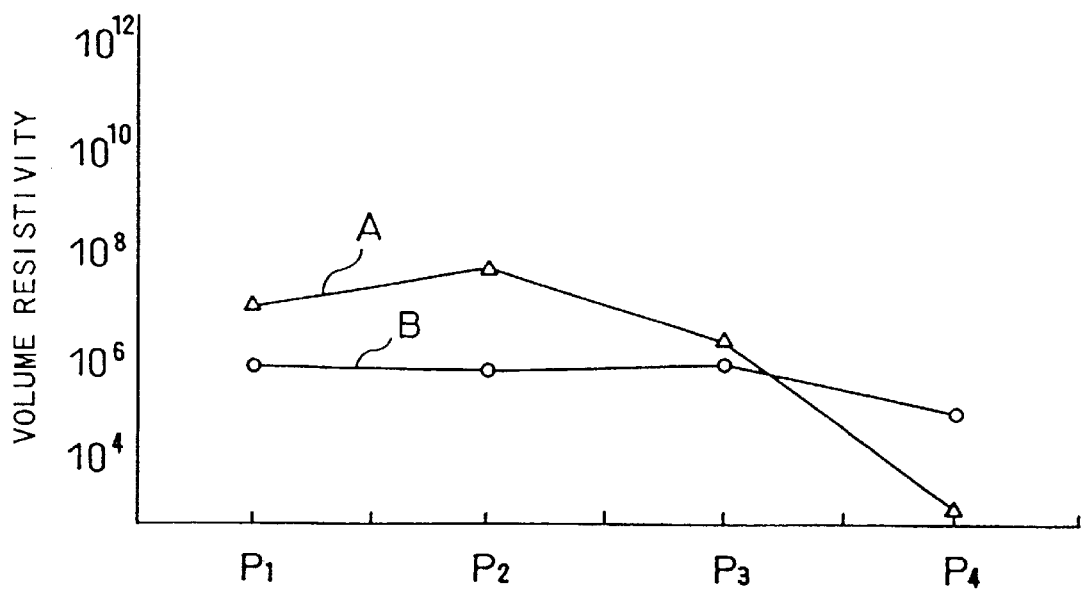
FIG. 34 is a graph showing the volume resistivity of the cover member at measuring points P1 through P4.
Figure 35:
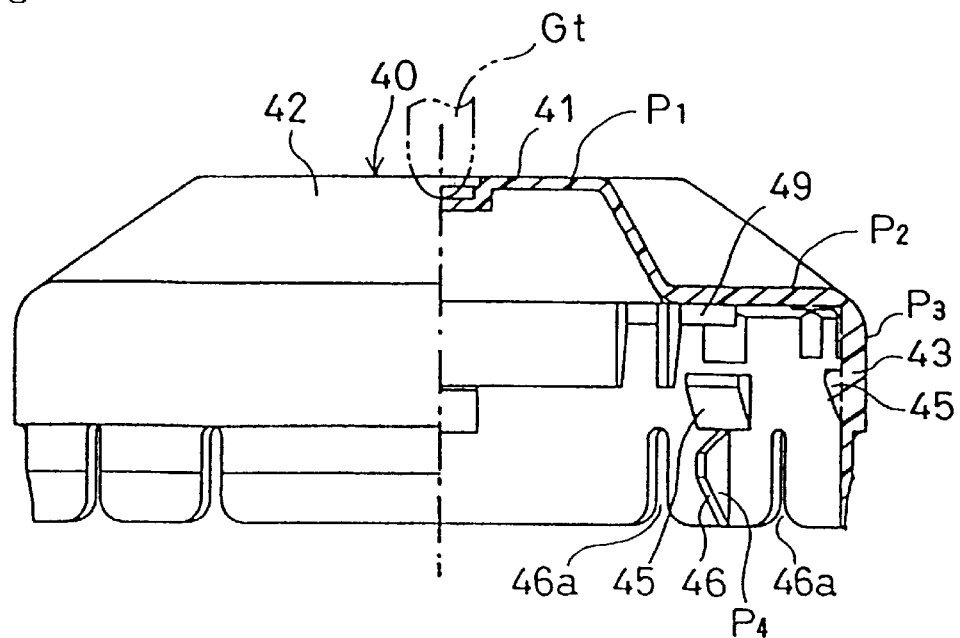
FIG. 35 shows the measuring points P1 through P4 of the cover member at which the volume resistivity of FIG. 34 is measured.

The volume resistivity of the cover member 40 discussed above is obtained by mixing conductive whiskers, conductive fillers, or conductive carbon with the resin material for injection molding. FIG. 34 is a graph showing the volume resistivity at various measurement points on the cover member 40. FIG. 35 shows measurement points P1 through P4 on the cover member 40. In the graph of FIG. 34, a measurement curve A denotes the volume resistivity when 5 parts by weight of conductive whiskers and 10 parts by weight of conductive carbon are mixed with 100 parts by weight of polyamide (PA). A measurement curve B denotes the volume resistivity when 20 parts by weight of conductive carbon are mixed with 100 parts by weight of polyamide (PA). One example of the conductive whiskers is Dentol (trade name, manufactured by Otsuka Chemical Co., Ltd.), and one example of the conductive carbon is Balkan XC-72 (trade name, manufactured by Cabot Co., Ltd.)

The conductive material, such as conductive whiskers, conductive fillers, or conductive carbon, is mixed with an insulating resin material, such as polyamide. Using only a conductive resin to obtain the above volume resistance lowers the resulting mechanical strength of the cover member 40 and does not fulfill the anti-shock condition of the cover member 40.

The measurement points P1 through P4 of the cover member 40 shown in FIG. 35 are set to have the volume resistivity shown in FIG. 34. The volume resistivity at the measurement point P4 on the discharge projection 46 is set to be lower than those at the measurement points P1 through P3 on the cover member 40. This is attained by the following process. A gate Gt of an injection molding machine is set on the center of the cover member 40 as shown in FIG. 35. The molten resin is charged from the gate Gt through the top wall 41 and the side wall 43 to the discharge projections 46. The conductive material is collected at a higher density at positions further from the gate Gt. The discharge projections 46 are set at the final charging position of the molten resin that is injected from the gate Gt. This causes the conductive material to be collected at a higher concentration in the discharge projections 46 than in any other part of the cover member 40, thereby enhancing the electrical conductivity of the discharge projections 46.

As discussed previously, the discharge slits 46a are formed on both sides of each discharge projection 46 along the circumference. The discharge slits 46a surround the discharge projection 46 and lead the flow of molten resin to the final charging position, thereby further increasing the density of the conductive material and improving the electrical conductivity.

Figure 36:
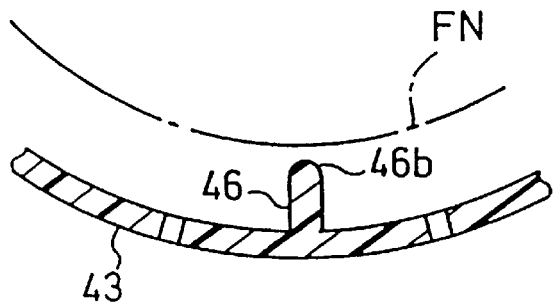
FIG. 36 is a sectional view illustrating the discharge projection in a horizontal direction.
Figure 37A:
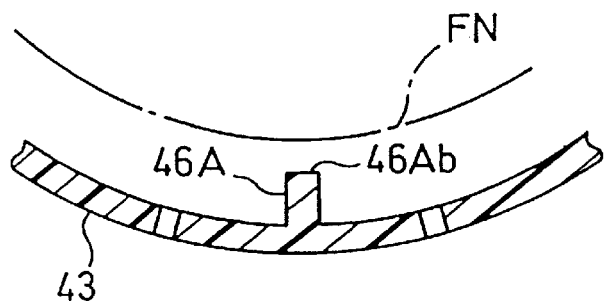
FIGS. 37 (A) and (B) illustrate functions of the discharge projection.
Figure 37B:
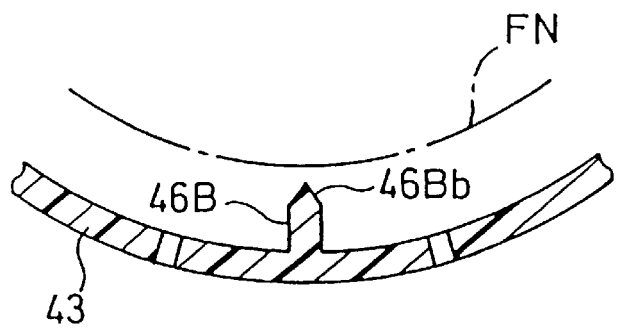
Figure 38:
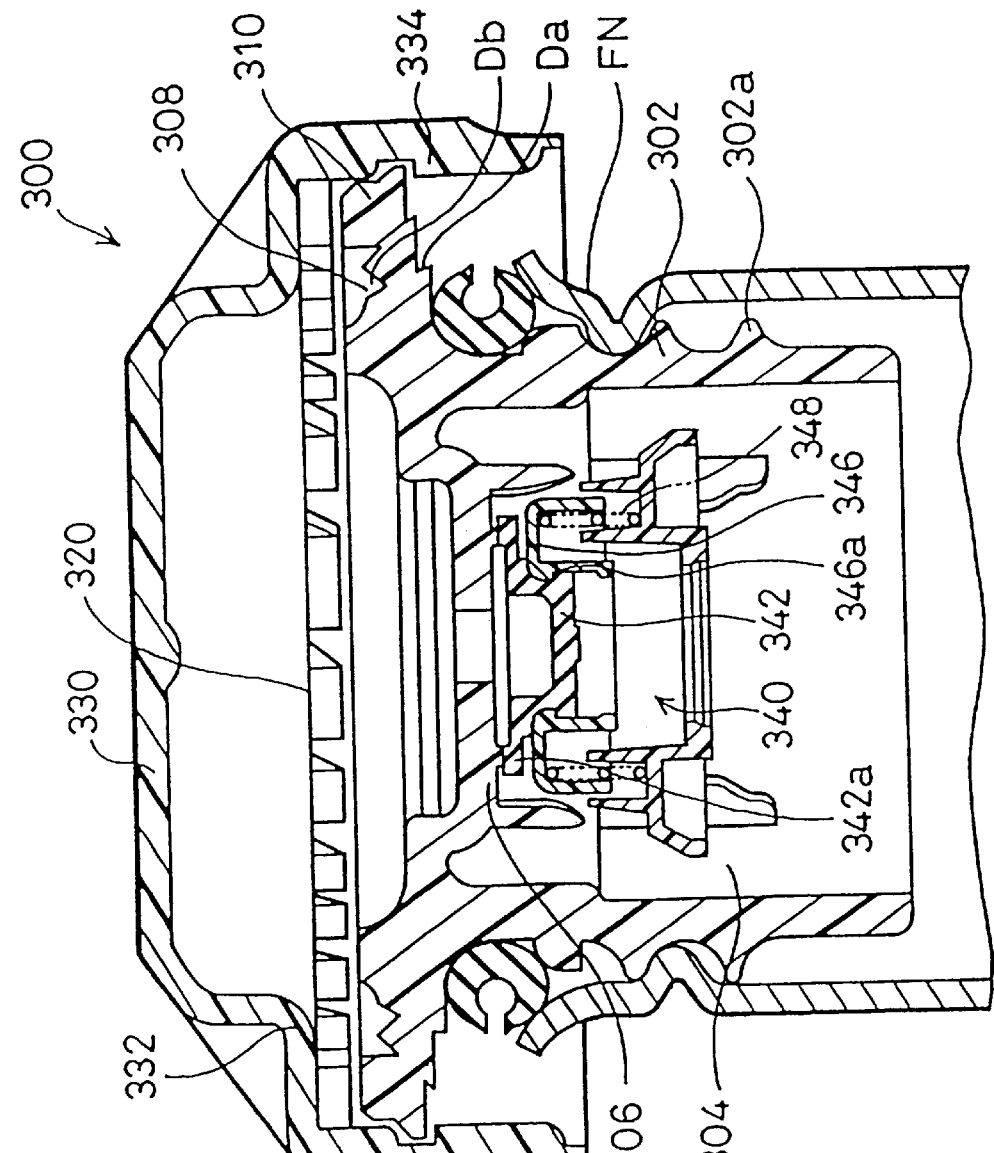
FIG. 38 is a sectional view illustrating a conventional fuel tank cap.

(6) FIG. 36 is a sectional view of the discharge projection 46 in the horizontal direction. As shown in FIG. 36, the discharge projection 46 has a semi-circular-shaped top portion 46b. A planar top portion 46Ab of a discharge projection 46A shown in FIG. 37(A) often causes an abrupt discharge of electricity, whereas a sharp top portion 46Bb of a discharge projection 46B shown in FIG. 37(B) causes a gentle discharge of electricity. For better discharge characteristics, it is thus preferable that the discharge projection has the sharp top portion like the discharge projection 46B. The sharp top portion 46Bb of the discharge projection 46B, however, causes a recess of a mold for molding the discharge projection 46B to be clogged and makes it difficult to remove the resin residue. In this embodiment, the discharge projection 46 accordingly has a semi-circular-shaped top portion 46b, which effectively allows the resin residue to be removed from the mold and forms the discharge projection 46 to the fixed shape.

The present invention is not restricted to the above embodiment, but there may be many other modifications, changes, and alterations without departing from the scope or spirit of the main characteristics of the present invention.

(1) In the above embodiment, the discharge projections 46 are formed integrally with the cover member 40. As long as the discharge projections 46 have the function of sufficiently discharging electricity, they may be formed separately from the cover member.

(2) In the embodiment, the discharge projections 46 are formed by the injection molding to have the smaller volume resistivity than any other part of the cover member 40. Another possible process applies a conductive material on the surface of the discharge projections 46.

(3) In the above embodiment, the electricity is discharged between the discharge projections 46 and the filler neck FN. The discharge of electricity may, however, be carried out between the discharge projections 46 and a member of the automobile body as long as it faces the discharge projections 46 and can ground the static electricity in the cover member 40.

It should be clearly understood that the above embodiment is only illustrative and not restrictive in any sense. The scope and spirit of the present invention are limited only by the terms of the appended claims.

What is claimed is:

1. A fuel tank cap which closes an inlet of a filler neck of fuel tank, said fuel tank cap comprising:
 a casing body, fabricated by resin injection molding, having a valve chamber, said casing body being molded by injecting a resin; and
 a pressure control valve received in said valve chamber, said casing body comprising:

an outer tubular body arranged to be fitted in said filler neck, an upper part of said outer tubular body supporting a casket attached to said filler neck;

a valve chamber-forming member located inside said outer tubular body across a gap, said valve chamber-forming member defining said valve chamber; and a horizontal joint member of a disk shape formed between said outer tubular body and said valve chamber-forming member, said horizontal joint member separating the gap into an upper hollow portion and a lower hollow portion and being located at a position lower than said gasket.

2. A fuel tank cap in accordance with claim 1, wherein said valve chamber-forming member comprises an upper cylindrical wall element, a lower wall element smaller than said upper cylindrical wall element, and a bottom element formed on a lower portion of said lower wall element, said upper cylindrical wall element, lower wall element and bottom element being integrally formed in a cup shape to form said valve chamber.

3. A fuel tank cap in accordance with claim 2, wherein said joint member comprises vertical joint members extending vertically between said valve chamber-forming member and said outer tubular body in a radial direction, said vertical joint members being arranged in said gap to connect said outer tubular body with said valve chamber-forming member.

4. A fuel tank cap in accordance with claim 2, wherein a seat member is located below said valve chamber-forming member and close to said horizontal joint member.

5. A fuel tank cap in accordance with claim 4, wherein said seat member comprises an inclined plane for joining said upper cylindrical wall element with said lower wall element along the circumference of said upper cylindrical wall element.

6. A fuel tank cap in accordance with claim 1, said fuel tank cap further comprising:

an inner cover that closes an opening of said valve chamber-forming member, wherein said inner cover has positioning ribs extending from an outer circumference thereof, said positioning ribs being inserted in said hollow portion to position said inner cover.

7. A fuel tank cap in accordance with claim 6, wherein said positioning ribs are arranged at 90-degree intervals along the circumference of said inner cover.

8. A fuel tank cap in accordance with claim 7, wherein said inner cover has been welded to the upper portion of valve chamber-forming member by ultrasonic welding, so that said opening is covered by said inner cover.

9. A fuel tank cap in accordance with claim 8, wherein said inner cover comprises a cylindrical support member that is inserted through said opening, said cylindrical support member being inserted within said upper cylindrical wall element of said valve chamber-forming member across a predetermined gap.

* * * * *